United States Patent
Carlini et al.

(10) Patent No.: US 7,473,310 B2
(45) Date of Patent: *Jan. 6, 2009

(54) NANOSIZED PARTICLES OF MONOAZO LAKED PIGMENT AND NON-AQUEOUS COMPOSITIONS CONTAINING SAME

(75) Inventors: Rina Carlini, Oakville (CA); Jeffrey H. Banning, Hillsboro, OR (US); C. Geoffrey Allen, Waterdown (CA); Sandra J. Gardner, Oakville (CA); Jonathan Siu-Chung Lee, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/962,651

(22) Filed: Dec. 21, 2007

(65) Prior Publication Data

US 2008/0302269 A1    Dec. 11, 2008

Related U.S. Application Data

(63) Continuation-in-part of application No. 11/759,913, filed on Jun. 7, 2007, now Pat. No. 7,465,348.

(51) Int. Cl.
    C09B 63/00 (2006.01)
    C09B 67/20 (2006.01)
    C09B 41/00 (2006.01)
(52) U.S. Cl. .................. 106/496; 106/402; 534/579
(58) Field of Classification Search ............ 106/402, 106/496; 534/579
    See application file for complete search history.

(56) References Cited

U.S. PATENT DOCUMENTS

| | | | |
|---|---|---|---|
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,364,729 A | 11/1994 | Kmiecik-Lawrynowicz et al. | |
| 5,370,963 A | 12/1994 | Patel et al. | |
| 5,372,852 A | 12/1994 | Titterington et al. | |
| 5,403,693 A | 4/1995 | Patel et al. | |
| 5,418,108 A | 5/1995 | Kmiecik-Lawrynowicz et al. | |
| 5,597,856 A | 1/1997 | Yu et al. | |
| 5,679,138 A | 10/1997 | Bishop et al. | |
| 5,997,628 A * | 12/1999 | Bindra .................. | 106/496 |
| 6,174,937 B1 | 1/2001 | Banning et al. | |
| 6,399,713 B1 | 6/2002 | MacQueen et al. | |
| 6,492,458 B1 | 12/2002 | Pavlin et al. | |
| 6,537,364 B2 | 3/2003 | Dietz et al. | |
| 6,837,918 B2 | 1/2005 | Pozarnsky et al. | |
| 6,989,055 B2 * | 1/2006 | Kitamura et al. ............ | 106/402 |
| 2003/0065084 A1 | 4/2003 | MacQueen et al. | |
| 2003/0199608 A1 | 10/2003 | Kamigaki et al. | |
| 2005/0109240 A1 | 5/2005 | Maeta et al. | |
| 2006/0063873 A1 | 3/2006 | Lin et al. | |
| 2007/0012221 A1 | 1/2007 | Maeta et al. | |
| 2007/0120921 A1 | 5/2007 | Carlini et al. | |
| 2007/0120924 A1 | 5/2007 | Odell et al. | |

FOREIGN PATENT DOCUMENTS

| | | |
|---|---|---|
| GB | 2 238 792 | 6/1991 |
| JP | 2005238342 A2 | 9/2005 |
| JP | 2007023168 | 2/2007 |
| JP | 2007023169 | 2/2007 |
| WO | 2004/026967 | 4/2004 |
| WO | 2006/005521 | 1/2006 |
| WO | 2006/005536 | 1/2006 |
| WO | 2006/011467 | 2/2006 |
| WO | 2006/024103 | 3/2006 |
| WO | 2006/132443 | 12/2006 |

OTHER PUBLICATIONS

U.S. Appl. No. 11/759,906, filed Jun. 7, 2007.
Hideki Maeta et al., "New Synthetic Method of Organic Pigment Nano Particle by Micro Reactor System," http://aiche.confex.com/aiche/s06/preliminary/program/abstract_40072.htm, date unknown.
K. Balakrishnan et al., "Effect of Side-Chain Substituents on Self-Assembly of Perylene Diimide Molecules: Morphology Control," *J. Am. Chem. Soc.*, vol. 128, p. 7390-98 (2006), no month.
Kazuyuki Hayashi et al., "Uniformed nano -downsizing of organic pigments through core-shell structuring," Journal of Materials Chemistry, 17(6), 527-530 (2007), no month.
Kento Ujiiye-Ishii et al., "Mass-Production of Pigment Nanocrystals by the Reprecipitation Method and their Encapsulation," *Molecular Crystals and Liquid Crystals*, v. 445 , p. 177 (2006), no month.
G. Wu and E. Matijevic, "Preparation and Characterization of Uniform Colloidal Pigments," *Journal of Dispersion Science and Technology*, vol. 19, p. 903-913 (1998), no month.
U.S. Appl. No. 11/759,913 to Rina Carlini et al. filed Jun. 7, 2007.
U.S. Appl. No. 11/933,469 to C. Geoffrey Allen filed Nov. 1, 2007.
U.S. Appl. No. 11/933,463 to Rina Carlini et al. filed Nov. 1, 2007.
U.S. Appl. No. 11/933,471 to Rina Carlini et al. filed Nov. 1, 2007.
U.S. Appl. No. 11/933,455 to C. Geoffrey Allen et al. filed Nov. 1, 2007.

* cited by examiner

*Primary Examiner*—Anthony J Green
(74) *Attorney, Agent, or Firm*—Oliff & Berridge, PLC

(57) ABSTRACT

A nanoscale pigment particle composition includes an organic monoazo laked pigment including at least one functional moiety, and a sterically bulky stabilizer compound including at least one functional group, wherein the monoazo laked pigment includes a nono-azo dye molecule laked with a divalent metal cation; the functional moiety associates non-covalently with the functional group; and the presence of the associated stabilizer limits the extent of particle growth and aggregation, to afford nanoscale-sized pigment particles. Non-aqueous dispersion compositions, such as ink compositions, contain a polymeric dispersant, an organic liquid, and the nanoscale pigment particle composition.

28 Claims, 1 Drawing Sheet

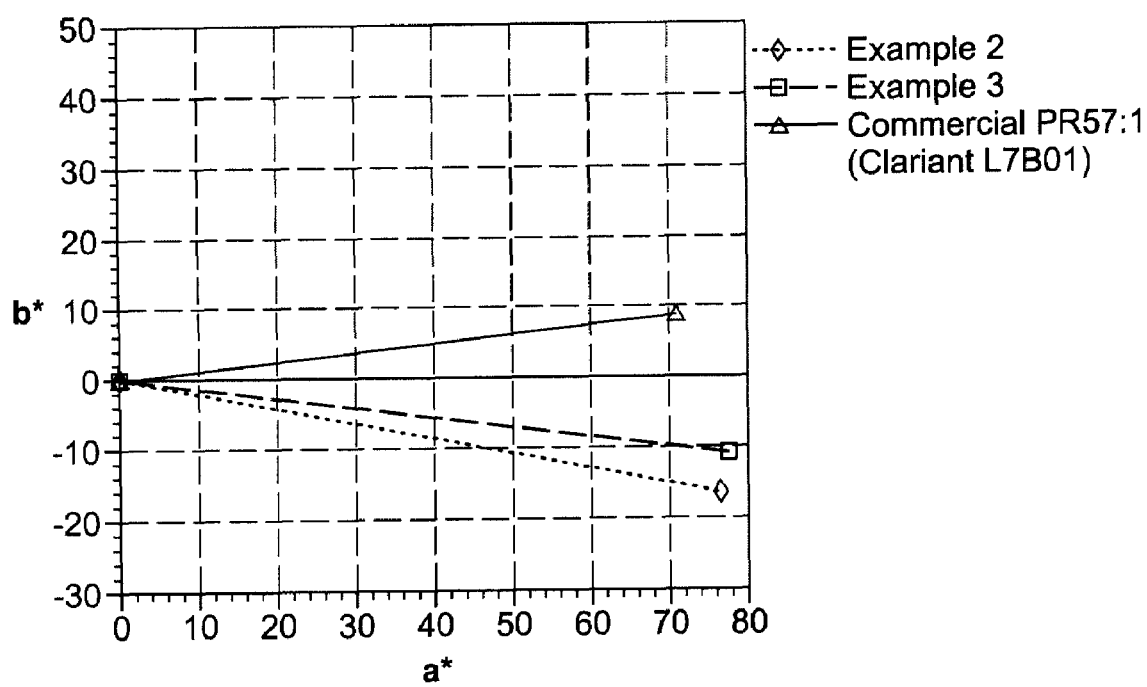

NANOSIZED PARTICLES OF MONOAZO LAKED PIGMENT AND NON-AQUEOUS COMPOSITIONS CONTAINING SAME

This application is a continuation-in-part of U.S. patent application Ser. No. 11/759,913 to Rina Carlini et al. filed Jun. 7, 2007, the entire disclosure of which is incorporated herein by reference.

TECHNICAL FIELD

This disclosure is generally directed to nanoscale pigment particle compositions and non-aqueous compositions containing such compositions. More specifically, this disclosure is directed to organic monoazo laked nanoscale pigments and non-aqueous compositions containing dispersions of such pigments, where the monoazo colorant molecules are laked with a metal cation other than $Ca^{2+}$. Such compositions are useful, for example, as colorants for ink compositions.

CROSS-REFERENCE TO RELATED APPLICATIONS

Disclosed in commonly assigned U.S. patent application Ser. No. 11/759,913 to Rina Carlini et al. filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a metal cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Disclosed in commonly assigned U.S. patent application Ser. No. 11/933,469 to C. Geoffrey Allen filed Nov. 1, 2007, is a nanoscale pigment particle composition, comprising: an organic monoazo laked pigment including at least one functional moiety, and a sterically bulky stabilizer compound including at least one functional group, wherein the functional moiety on the pigment associates non-covalently with the functional group of the stabilizer; and the nanoscale pigment particles have an average particle size of from about 10 nm to about 500 nm and have tunable coloristic properties that depend on both particle composition and average particle size.

Disclosed in commonly assigned U.S. patent application Ser. No. 11/933,463 to Rina Carlini et al. filed Nov. 1, 2007, is a non-aqueous dispersion composition comprising: a non-aqueous carrier, a polymeric dispersant, a polymer resin, and a nanoscale pigment particle composition comprising: an organic monoazo laked pigment including at least one functional moiety, and a sterically bulky stabilizer compound including at least one functional group, wherein the functional moiety of the pigment associates non-covalently with the functional group of the stabilizer; and the presence of the associated stabilizer limits the extent of particle growth and aggregation, so as to afford nanoscale-sized pigment particles.

Disclosed in commonly assigned U.S. patent application Ser. No. 11/933,471 to Rina Carlini et al. filed Nov. 1, 2007, is a process for preparing nanoscale particles of monoazo laked pigments, comprising: providing an organic pigment precursor to a monoazo laked pigment that contains at least one functional moiety, providing a sterically bulky stabilizer compound that contains at least one functional group, and carrying out a chemical reaction to form a monoazo laked pigment composition, whereby the functional moiety found on the pigment precursor is incorporated within the monoazo laked pigment and non-covalently associated with the functional group of the stabilizer, so as to allow the formation of nanoscale-sized pigment particles.

Disclosed in commonly assigned U.S. patent application Ser. No. 11/933,455 to C. Geoffrey Allen et al. filed Nov. 1, 2007, is a radiation curable ink composition comprising: a radiation curable material, a polymeric dispersant, and a nanoscale pigment particle composition comprising: an organic monoazo laked pigment including at least one functional moiety, and a sterically bulky stabilizer compound including at least one functional group, wherein the functional moiety of the pigment associates non-covalently with the functional group of the stabilizer; and the presence of the associated stabilizer limits the extent of particle growth and aggregation, to afford nanoscale-sized pigment particles.

The entire disclosure of the above-mentioned application is totally incorporated herein by reference.

BACKGROUND

A printing ink is generally formulated according to strict performance requirements demanded by the intended market application and required properties. Whether formulated for office printing or for production printing, a particular ink is expected to produce images that are robust and durable under stress conditions. In a typical design of a piezoelectric ink jet printing device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Pigments are a class of colorants useful in a variety of applications such as, for example, paints, plastics and inks. Dyes have typically been the colorants of choice for inkjet printing inks because they are readily soluble colorants which enable jetting of the ink. Dyes have also offered superior and brilliant color quality with an expansive color gamut for inks, when compared with conventional pigments. However, since dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water- or solvent-fastness). In certain situations, pigments are the better alternative as colorants for inkjet printing inks since they are insoluble and cannot be molecularly dissolved within the ink matrix, and therefore do not experience colorant diffusion. Pigments are also significantly less expensive than dyes, and so are attractive colorants for use in all printing inks.

Key issues with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, there is a need addressed by embodiments of the present invention, for smaller pigment particles that minimize or avoid the problems associated with conventional pigment particles. The present nanosized pigment particles are useful in for example paints, coatings and inks (e.g., inkjet printing inks) and other compositions where pigments can be used such as plastics, optoelectronic imaging components, photographic components and cosmetics.

The following documents provide background information:

Hideki Maeta et al., "New Synthetic Method of Organic Pigment Nano Particle by Micro Reactor System," in an abstract available on the internet, describes a new synthetic method of an organic pigment nano particle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

G. Wu and E. Matijevic, "Preparation and Characterization of Uniform Colloidal Pigments," *Journal of Dispersion Science and Technology*, vol. 19, p. 903-913 (1998), describes the preparation and optical properties of colloidal pigment dispersions of narrow size distributions obtained by interacting aqueous solutions of D&C Red #6 monoazo dye with barium chloride, to precipitate the monoazo barium-laked pigment of the same dye, optionally in the presence of a common anionic surfactant. However, pigment particles of nanoscale size dimensions having low aspect ratio (less than about 10:1) were only obtained when the pigment particle precipitation step was carried out under the combined effects of ultrasonication energy and agitation.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

Wo 2006/011467 discloses a pigment, which is used, for example, in color image display devices and can form a blue pixel capable of providing a high level of bright saturation, particularly a refined pigment, which has bright hue and is excellent in pigment properties such as lightfastness, solvent resistance and heat resistance, and a process for producing the same, a pigment dispersion using the pigment, and an ink for a color filter. The pigment is a subphthalocyanine pigment that is prepared by converting subphthalocyanine of the specified formula, to a pigment, has diffraction peaks at least at diffraction angles (2θ) 7.0°, 12.3°, 20.4° and 23.4° in X-ray diffraction and an average particle diameter of 120 to 20 nm.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

WO 2006/024103 discloses nanopigments prepared from organic IR dye and Na-bentonite with CEC of 95 mmole Na per 100 g of bentonite, at room temperature, by dissolving the Na-bentonite in water and mixing for 2 hours, and mixing in the dye, dissolved in ethanol, for 18 hours. The precipitate is filtered, washed three times with water/ethanol mixture, dried at 105° C. for 10 hours, and milled in a kitchen miller for 2 mins. 0.3 parts of the nanopigments were mixed to 100 parts of pulverized SPG resin and processed in an extruder with a die temperature of 190° C. to form transparent, faintly green or grey colored extrudates which were used to press film of 0.4 mm thickness at 160° C. The films were used to prepare IR-active laminated glass. Near infrared absorption spectra of the glass structures were obtained in a Perkin-Elmer Spectrophotometer.

WO 2006/005521 discloses a photoprotective composition comprising, in a physiologically acceptable medium: a) at least one aqueous phase, b) at least hydrophilic metal oxide nanoparticles, c) at least one vinylpyrrolidone homopolymer. The reference also discloses the use of at least one vinylpyrrolidone homopolymer in a photoprotective composition comprising at least one aqueous phase and at least hydrophilic metal oxide nanoparticles for the purpose of reducing the whitening and/or of improving the stability of the said composition.(dispersibility of the nanoparticles in the aqueous phase).

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

Japanese Patent Application Publication No. JP 2005238342 A2 discloses irradiating ultrashort pulsed laser to organic bulk crystals dispersed in poor solvents to induce ablation by nonlinear absorption for crushing the crystals and recovering the resulting dispersions of scattered particles. The particles with average size approximately 10 nm are obtained without dispersants or grinding agents for contamination prevention and are suitable for pigments, pharmaceuticals, etc.

U.S. Patent Application Publication No. 2003/0199608 discloses a functional material comprising fine coloring particles having an average primary particle diameter of 1 to 50 nm in a dried state, and having a BET specific surface area value of 30 to 500 $m^2/g$ and a light transmittance of not less than 80%. The functional material composed of fine coloring particles, exhibits not only an excellent transparency but also a high tinting strength and a clear hue.

U.S. Pat. No. 6,837,918 discloses a process and apparatus that collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 μm, and further has the acidic group.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing nanoscale pigment particle compositions, and non-aqueous compositions comprising such nanoscale pigment particle compositions.

In an embodiment, the present disclosure provides a nanoscale-sized pigment particle composition, comprising:

an organic monoazo laked pigment including at least one functional moiety, and a sterically bulky stabilizer compound including at least one functional group, wherein the monoazo laked pigment comprises a monoazo dye molecule laked with a divalent metal cation;

the functional moiety of the pigment associates non-covalently with the functional group of the stabilizer; and the presence of the associated stabilizer limits the extent of particle growth and aggregation, so as to afford nanoscale-sized pigment particles.

In another embodiment, the disclosure provides ink compositions, such as non-aqueous ink compositions, generally comprising at least a carrier such as an organic liquid, a polymeric dispersant, and the above nanoscale pigment particle composition.

BRIEF DESCRIPTION OF THE DRAWINGS

The FIGURE shows a two-dimensional b* a* Gamut for pigmented coatings according to embodiments (normalized to optical density=1.5).

DETAILED DESCRIPTION OF EXEMPLARY EMBODIMENTS

Embodiments of the present disclosure provide nanoscale pigment particle compositions where the monoazo colorant molecules are laked with a metal cation other than $Ca^{2+}$, as well as non-aqueous compositions containing such compositions. The non-aqueous compositions containing generally comprise a polymeric dispersant, an organic liquid, and nanoscale pigment particle compositions comprising an organic monoazo laked pigment including at least one functional moiety that associates non-covalently with a functional group from a sterically bulky stabilizer compound. The presence of the associated stabilizer limits the extent of particle growth and aggregation, so as to afford nanoscale particles. The non-aqueous compositions containing generally a polymeric dispersant, an organic liquid, and said nanoscale pigment particle compositions, and are useful, for example, as ink compositions.

Organic monoazo "laked" pigments are the insoluble metal salt colorants of monoazo colorants which can include monoazo dyes or pigments, and in certain geographic regions these pigments have been referred to as either "toners" or "lakes". The process of ion complexation with a metal salt, or "laking" process, provides decreased solubility of the non-ionic monoazo pigment, which can enhance the migration resistance and thermal stability properties of a monoazo pigment, and thereby enable the applications of such pigments for robust performance, such as colorizing plastics and heat-stable paints for outdoor use. Formula 1 depicts a general representation of monoazo laked pigments, which are ionic compounds that are structurally comprised of a diazo group (denoted $G_d$) and a nucleophilic coupling group (denoted as $G_c$) that are linked together with one azo (N=N) functional group, and a cation ($M^{n+}$) which is typically a metal salt. Either or both of the groups $G_d$ and $G_c$ can contain one or more ionic functional moieties (denoted as FM), such as sulfonate or carboxylate anions or the like.

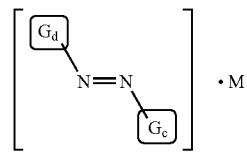

Formula (1)

As an example, the organic pigment PR 57:1 ("PR" refers to Pigment Red) has two functional moieties of two different types, a sulfonate anion group ($SO_3^- M''^+$) and carboxylate anion group ($CO_2^- Mn^+$), wherein $Mn^+$ represents a divalent countercation such as $Ca^{2+}$ or other divalent metal cation. Further, the azo group in the compounds can generally assume two different tautomer forms, such as the "azo" form which has the (N=N) linkage, and the "hydrazone" form which has the (C=N—NH—) linkage that is stabilized by an intramolecular hydrogen bond, where the hydrazone tautomer is known to be the preferred structural form for PR 57:1.

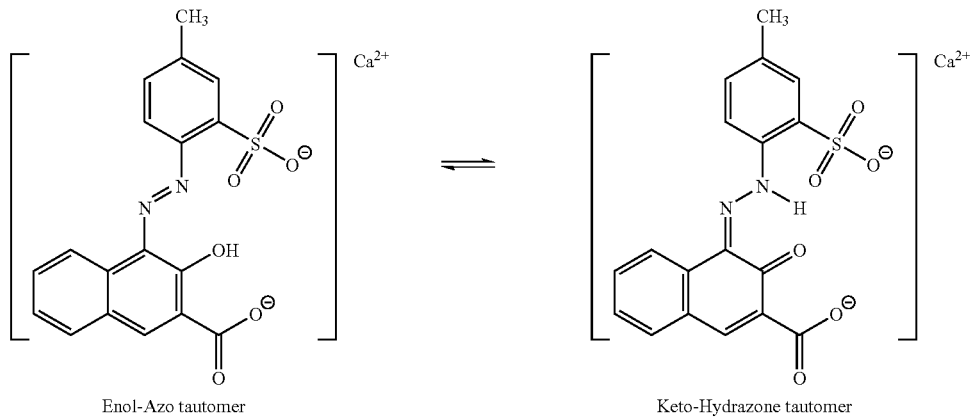

Enol-Azo tautomer      Keto-Hydrazone tautomer

It is provided that formula (1) is understood to denote both such tautomer forms. Due to the structural nature of monoazo laked pigments being ionic salts, it is possible to have compounds that associate non-covalently with the pigment, such as organic or inorganic ionic compounds that can associate with the metal cation through ionic or coordination-type bonding. Such ionic compounds are included in a group of compounds which herein are referred to as "stabilizers", and that function to reduce the surface tension of the pigment particle and neutralize attractive forces between two or more pigment particles or structures, thereby stabilizing the chemical and physical structure of the pigment.

The term "complementary" as used in complementary functional moiety of the stabilizer indicates that the complementary functional moiety is capable of noncovalent chemical bonding with the functional moiety of the organic pigment and/or the functional moiety of the pigment precursor.

The term "precursor" as used in "precursor to the organic pigment" can be any chemical substance that is an advanced intermediate in the total synthesis of a compound (such as the organic pigment). In embodiments, the organic pigment and the precursor to the organic pigment may or may not have the same functional moiety. In embodiments, the precursor to the organic pigment may or may not be a colored compound. In still other embodiments, the precursor and the organic pigment can have different functional moieties. In embodiments, where the organic pigment and the precursor have a structural feature or characteristic in common, the phrase "organic pigment/pigment precursor" is used for convenience rather than repeating the same discussion for each of the organic pigment and the pigment precursor.

The functional moiety (denoted as FM) of the organic pigment/precursor can be any suitable moiety capable of non-covalent bonding with the complementary functional group of the stabilizer. Illustrative functional moieties of the organic pigment/precursor include (but are not limited to) the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

Pigment precursors for making monoazo laked nanopigments consist of a substituted aniline precursor (denoted as "DC" in Table 1) which forms the diazo group $G_d$ of Formula (1), a nucleophilic or basic coupling compound (denoted as "CC" in Tables 2-6) which leads to the coupling group $G_c$ of Formula (1), and a divalent cation salt which is preferably a metal (denoted as "M" as shown in Formula (1)). Representative examples of the aniline precursor of laked monoazo pigments that have the functional moiety capable of non-covalent bonding with a complementary functional group on the stabilizer, include (but are not limited to) the following structures (with the functional moiety "FM" denoted, if applicable):

In an embodiment, the substituted aniline precursor (DC) which leads to the diazonium group can be of the formula (2):

Formula (2)

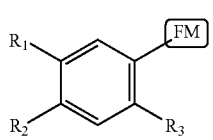

where $R_1$, $R_2$, and $R_3$ independently represent H, a straight or branched alkyl group of from about 1 to about 10 carbon atoms (such as methyl, ethyl, propyl, butyl, and the like), halogen (such as Cl, Br, I), $NH_2$, $NO_2$, $CO_2H$, $CH_2CH_3$, and the like; and functional moiety FM represents $SO_3H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$, and the like. The substituted aniline precursor (DC) can be also be Tobias Acid, of the formula (3):

Formula (3)

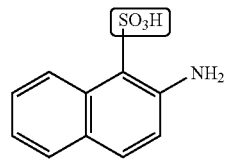

Specific examples of types of aniline precursors (DC) that are used to make the diazo group $G_d$ in the monoazo laked pigments include those of Table 1:

TABLE 1

| Precursor to Group $G_d$ | Functional Moiety FM | $R_1$ | $R_2$ | $R_3$ |
|---|---|---|---|---|
| DC1 | $SO_3H$ | $CH_3$ | H | $NH_2$ |
| DC2 | $SO_3H$ | $CH_3$ | Cl | $NH_2$ |
| DC3 | $SO_3H$ | Cl | $CH_3$ | $NH_2$ |
| DC4 | $SO_3H$ | Cl | $CO_2H$ | $NH_2$ |
| DC5 | $SO_3H$ | Cl | $CH_2CH_3$ | $NH_2$ |
| DC6 | $SO_3H$ | Cl | Cl | $NH_2$ |
| DC7 | $SO_3H$ | H | $NH_2$ | H |
| DC8 | $SO_3H$ | H | $NH_2$ | $CH_3$ |
| DC9 | $SO_3H$ | $NH_2$ | H | Cl |
| DC10 | $SO_3H$ | H | H | $NH_2$ |
| DC11 | $SO_3H$ | H | $NH_2$ | H |
| DC12 | $SO_3H$ | $NO_2$ | $NH_2$ | H |
| DC13 | —C(=O)—NH—C6H4—$SO_3^-$ | $NH_2$ | $CH_3$ | H |
| DC14 | $CO_2H$ | H | H | $NH_2$ |
| DC15 | Cl | H | H | $NH_2$ |
| DC16 | $NH_2$ | $CH_3$ | H | H |
| DC17 | $NH_2$ | H | $CH_3$ | H |
| DC18 | —C(=O)—$NH_2$ | $NH_2$ | $CH_3$ | H |
| DC19 | —C(=O)—$NH_2$ | H | $NH_2$ | H |
| DC20 | $NH_2$ | H | H | H |
| DC21 | (Tobias Acid structure) | | | |

In an embodiment, the coupling group $G_c$ of Formula (1) can include β-naphthol and derivatives of Formula (4), naphthalene sulfonic acid derivatives of Formulas (5) and (6), pyrazolone derivatives of Formula (7), acetoacetic arylide derivatives of Formula (8), and the like. In formulas (4)-(8), the asterisk "*" denotes the point of coupling or attachment to the monoazo (N=N) linkage.

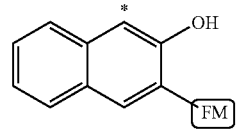

Formula (4)

where FM represents H, $CO_2H$, $SO_3H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$, substituted benzamides such as:

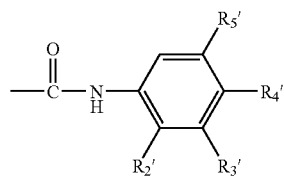

wherein groups $R_2'$ $R_3'$, $R_4'$ and $R_5'$ can independently be H, alkyl groups having from about 1 to 10 carbons (such as methyl, ethyl, propyl, butyl, and the like), alkoxyl groups (such as $OCH_3$, $OCH_2CH_3$, and the like), hydroxyl or halogen (such as Cl, Br, I, F) or nitro $NO_2$; or benzimidazolone amides such as:

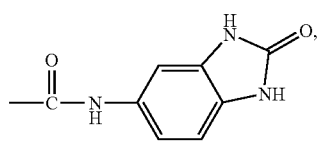

and the like.

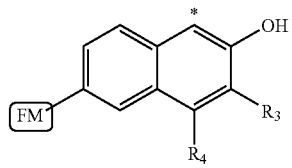

Formula (5)

where FM represents preferably $SO_3H$, but also can represent $CO_2H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$ groups $R_3$ and $R_4$ independently represent H, $SO_3H$, and the like.

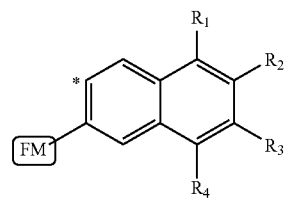

Formula (6)

where FM represents preferably $SO_3H$, but also can represent $CO_2H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$; $R_1$, $R_2$, $R_3$ and $R_4$ independently represent H, $SO_3H$, —C(=O)—NH-Phenyl, and the like.

Formula (7)

[Formula (7) structure]

where G represents $CO_2H$, straight or branched alkyl such as having from 1 to about 10 carbons atoms (such as methyl, ethyl, propyl, butyl, or the like), and the like; and $R_1'$, $R_2'$, $R_3'$ and $R_4'$ independently represent H, halogen (such as Cl, Br, I), $SO_3H$, nitro ($NO_2$) or alkoxyl group such as $OCH_3$ or $OCH_2CH_3$ and the like.

Formula (8)

[Formula (8) structure]

where $R_1'$ represents a straight or branched alkyl group having, for example, from 1 to about 10 carbon atoms (such as methyl, ethyl, propyl, butyl, and the like); $R_2'$ represents a benzimidazolone group:

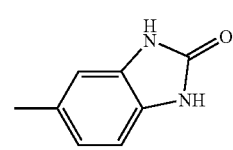

or a substituted aryl group

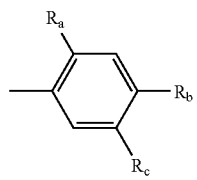

where each of $R_a$, $R_b$, and $R_c$ independently represents H, a straight or branched alkyl group having, for example, from 1 to about 10 carbon atoms (such as methyl, ethyl, propyl, butyl, and the like), alkoxyl groups such as $OCH_3$ or $OCH_2CH_3$ and the like, halogen (such as Cl, Br, I), nitro $NO_2$, and the like.

Representative examples of the nucleophilic coupling component as a precursor of laked monoazo pigments which have the functional moiety that is capable of non-covalent bonding with a complementary functional group on the stabilizer, include (but are not limited to) the following structures shown in Tables 2-6 (with the functional moiety "FM" denoted, if applicable):

TABLE 2

* = point of coupling to diazo component

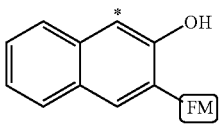

| Precursor to group $G_c$ | Class of Coupling Component | Functional Moiety FM |
|---|---|---|
| CC1 | β-Naphthol | H |
| CC2 | β-oxynaphthoic acid ("BONA") | $CO_2H$ |
| CC3 | Naphthol AS derivatives | 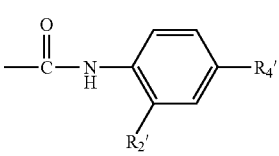 |
| CC6 | Benzimidazolone | 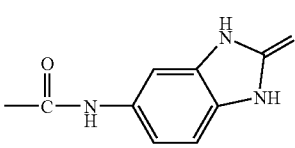 |

TABLE 3

* = point of coupling to diazo component

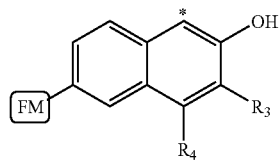

| Precursor to group $G_c$ | Class of Coupling Component | FM | $R_3$ | $R_4$ |
|---|---|---|---|---|
| CC4a | Naphthalene Sulfonic Acid derivatives | $SO_3H$ | H | H |
| CC4b | Naphthalene Sulfonic Acid derivatives | $SO_3H$ | $SO_3H$ | H |

TABLE 4

* = point of coupling to diazo component

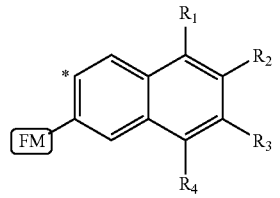

| Precursor to group $G_c$ | Class of Coupling Component | FM | $R_1$ | $R_2$ | $R_3$ | $R_4$ |
|---|---|---|---|---|---|---|
| CC5 | Naphthalene Sulfonic Acid derivatives | $SO_3H$ | NHPh) | H | H | $SO_3H$ |

TABLE 5

* = point of coupling to diazo component

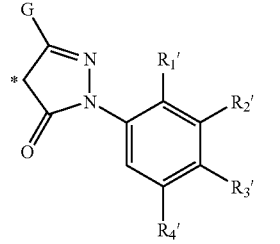

| Precursor to group $G_c$ | Class of Coupling Component | G | $R_1'$ | $R_2'$ | $R_3'$ | $R_4'$ |
|---|---|---|---|---|---|---|
| CC7 | Pyrazolone deriv. | $CO_2H$ | H | H | $SO_3H$ | H |
| CC8 | Pyrazolone deriv. | $CH_3$ | H | H | $SO_3H$ | H |
| CC9 | Pyrazolone deriv. | $CH_3$ | H | $SO_3H$ | H | H |
| CC10 | Pyrazolone deriv. | $CH_3$ | Cl | H | $SO_3H$ | Cl |

TABLE 6

\* = point of coupling to diazo component $$R_1'-\underset{O}{\overset{O}{C}}-CH_2(*)-\underset{O}{\overset{O}{C}}-N(H)-R_2'$$

| Precursor to group $G_c$ | Class of Coupling Component | $R_1'$ | $R_2'$ | $R_a$ | $R_b$ | $R_c$ |
|---|---|---|---|---|---|---|
| CC11 | Acetoacetic arylide | $CH_3$ | phenyl with $R_a$, $R_b$, $R_c$ substituents | H | H | H |
| CC12 | Acetoacetic arylide | $CH_3$ | phenyl with $R_a$, $R_b$ substituents | $CH_3$ | H | H |
| CC13 | Acetoacetic arylide | $CH_3$ | phenyl with $R_a$, $R_b$ substituents | Cl | H | H |
| CC14 | Acetoacetic arylide | $CH_3$ | phenyl with $R_a$, $R_b$, $R_c$ substituents | H | $OCH_3$ | H |
| CC15 | Acetoacetic benzimidazolone | $CH_3$ | benzimidazolone | — | — | — |

In embodiments, the counterion M in Formula (1) can be any suitable countercation, and in embodiments is a metal countercation, $Mn^+$, where M is a metal and n can have any suitable oxidation state such as 1, 2, 3, or 4. According to this disclosure, the monoazo molecules (i.e. the dye precursors) are laked with a divalent metal cation+, or a mixture of monoazo laked molecules are provided where some of the monoazo molecules are laked with mixtures of $Ca^{2+}$ and a different divalent metal cation. In particular, it has been found that selection of particular metal cations for laking the monoazo molecules, in combination with use of the sterically bulky stabilizer compound for producing the nanoscale pigment particles, allows for specific color selection of the nanoscale pigment particles. This color selection can be further enhanced by using combinations of monoazo molecules that are laked with combinations of two or more different cations.

For example, commercially available Pigment Red 57:1 particles having larger than nanometer-sized particles, provide red to yellowish-red hues. It has previously been shown that providing nano-scale pigment red 57:1 laked with $Ca^{2+}$ provides bluish-red hues, which can be tuned by varying both the nanoscale particle size and composition of pigment with stabilizer. However, by using various counter-cations other than calcium $Ca^{2+}$, either solely or in various combinations with $Ca^{2+}$ during laking of the monoazo molecules, the color hue of the precipitated pigment particles can be tuned towards either yellowish-red hues or red or bluish-red hues as other coloristic properties, while still maintaining a nanoparticle size.

The organic pigment can include a counterion as part of the overall structure. Such counterions can be, for example, cations or anions of either metals or non-metals that include N, P, S and the like, or carbon-based cations or anions. Examples of suitable metal cations include ions of Ba, Ca, Cu, Mg, Sr, Li, Na, K, Cs, Mn, Cu, Cr, Fe, Ti, Ni, Co, Zn, V, B, Al, Ga, and other metal ions. Examples of non-metal based counter-cations include ammonium and phosphonium cations, mono-, di-, tri-, and tetra-substituted ammonium and phosphonium cations, where the substitutents can be aliphatic alkyl groups, such as methyl, ethyl, butyl, stearyl and the like, as well as aryl groups such as phenyl or benzyl and the like.

Representative examples of monoazo laked pigments comprised from a selection of substituted aniline precursors (denoted DC) which can also include Tobias Acid, nucleophilic coupling component (denoted as CC) and metal salts (denoted as M) to provide the counter-cation $M^{n+}$ of formula (1) are listed in Table 7, and other laked pigment structures may arise from other combinations of DC and CC and metal cation salt (M) that are not shown in Table 7.

The complementary functional group of the stabilizer can be one or more of any suitable moiety capable of non-covalent bonding with the functional moiety of the stabilizer. Illustrative complementary functional groups on the stabilizer include the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and pip-

TABLE 7

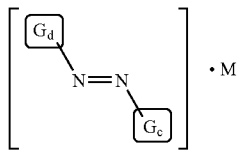

| Color Index # (C.I.) | Color Index (C.I.) Name | Laked Pigment Class | $G_d$ precursor | $G_c$ precursor | Metal Salt M |
|---|---|---|---|---|---|
| 15500:1 | Red 50:1 | β-Naphthol Lakes | DC14 | CC1 | ½ Ba |
| 15510:1 | Orange 17 | β-Naphthol Lakes | DC7 | CC1 | Ba |
| 15510:2 | Orange 17:1 | β-Naphthol Lakes | DC7 | CC1 | ⅔ Al |
| 15525 | Red 68 | β-Naphthol Lakes | DC4 | CC1 | 2 Ca |
| 15580 | Red 51 | β-Naphthol Lakes | DC8 | CC1 | Ba |
| 15585 | Red 53 | β-Naphthol Lakes | DC3 | CC1 | 2 Na |
| 15585:1 | Red 53:1 | β-Naphthol Lakes | DC3 | CC1 | Ba |
| 15585:3 | Red 53:3 | β-Naphthol Lakes | DC3 | CC1 | Sr |
| 15602 | Orange 46 | β-Naphthol Lakes | DC5 | CC1 | Ba |
| 15630 | Red 49 | β-Naphthol Lakes | DC21 | CC1 | 2 Na |
| 15630:1 | Red 49:1 | β-Naphthol Lakes | DC21 | CC1 | Ba |
| 15630:2 | Red 49:2 | β-Naphthol Lakes | DC21 | CC1 | Ca |
| 15630:3 | Red 49:3 | β-Naphthol Lakes | DC21 | CC1 | Sr |
| 15800 | Red 64 | β-oxynaphthoic acid (BONA) Lakes | DC20 | CC2 | ½ Ba |
| 15800:1 | Red 64:1 | β-oxynaphthoic acid (BONA) Lakes | DC20 | CC2 | ½ Ca |
| 15800:2 | Brown 5 | β-oxynaphthoic acid (BONA) Lakes | DC20 | CC2 | ½ Cu |
| 15825:2 | Red 58:2 | β-oxynaphthoic acid (BONA) Lakes | DC9 | CC2 | Ca |
| 15825:4 | Red 58:4 | β-oxynaphthoic acid (BONA) Lakes | DC9 | CC2 | Mn |
| 15850:1 | Red 57:1 | β-oxynaphthoic acid (BONA) Lakes | DC1 | CC2 | Ca |
| 15860:1 | Red 52:1 | β-oxynaphthoic acid (BONA) Lakes | DC3 | CC2 | Ca |
| 15860:2 | Red 52:2 | β-oxynaphthoic acid (BONA) Lakes | DC3 | CC2 | Mn |
| 15865:1 | Red 48:1 | β-oxynaphthoic acid (BONA) Lakes | DC2 | CC2 | Ba |
| 15865:2 | Red 48:2 | β-oxynaphthoic acid (BONA) Lakes | DC2 | CC2 | Ca |
| 15865:3 | Red 48:3 | β-oxynaphthoic acid (BONA) Lakes | DC2 | CC2 | Sr |
| 15865:4 | Red 48:4 | β-oxynaphthoic acid (BONA) Lakes | DC2 | CC2 | Mn |
| 15865:5 | Red 48:5 | β-oxynaphthoic acid (BONA) Lakes | DC2 | CC2 | Mg |
| 15867 | Red 200 | β-oxynaphthoic acid (BONA) Lakes | DC5 | CC2 | Ca |
| 15880:1 | Red 63:1 | β-oxynaphthoic acid (BONA) Lakes | DC21 | CC2 | Ca |
| 15880:2 | Red 63:2 | β-oxynaphthoic acid (BONA) Lakes | DC21 | CC2 | Mn |
| 15892 | Red 151 | Naphthol AS Lakes | DC10 | CC3 ($R_2' = H$, $R_4' = SO_3H$) | Ba |
| 15910 | Red 243 | Naphthol AS Lakes | DC2 | CC3 ($R_2' = OCH_3$, $R_4' = H$) | ½ Ba |
| 15915 | Red 247 | Naphthol AS Lakes | DC13 | CC3 ($R_2' = H$, $R_4' = OCH_3$) | Ca |
| 15985:1 | Yellow 104 | Naphthalene Sulfonic Acid Lakes | DC7 | CC4a | ⅔ Al |
| 15990 | Orange 19 | Naphthalene Sulfonic Acid Lakes | DC15 | CC4a | ½ Ba |
| 16105 | Red 60 | Naphthalene Sulfonic Acid Lakes | DC14 | CC4b | ½ Ba |
| 18000:1 | Red 66 | Naphthalene Sulfonic Acid Lakes | DC16 | CC5 | ½ Ba, Na | erazinium salts, triazolo, tetraazolo, oxazole, oxazolines and oxazolinium salts, indoles, indenones, and the like.

The stabilizer can be any compound that has the function of limiting the extent of pigment particle or molecular self-assembly so as to produce predominantly nanoscale-sized pigment particles. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is coordinated to the pigment/precursor surface, occupies a 3-dimensional spatial volume that effectively prevents the approach or association of other chemical entities (e.g. colorant molecules, primary pigment particles or small pigment aggregate) toward the pigment/precursor surface. Thus, the stabilizer should have its hydrocarbon moiety large enough so that as several stabilizer molecules become non-covalently associated with the chemical entity (pigment or precursor), the stabilizer molecules act as surface barrier agents for the primary pigment particles and effectively encapsulates them, and thereby limits the growth of the pigment particles and affording only nanoparticles of the pigment. For example, for the pigment precursor Lithol Rubine and for the organic pigment Pigment Red 57:1, the following illustrative groups on a stabilizer are considered to have adequate "steric bulk" so as to enable the stabilizer to limit the extent of pigment self-assembly or aggregation and mainly produce pigment nano-sized particles:

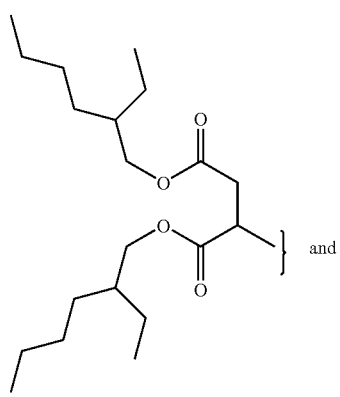
and

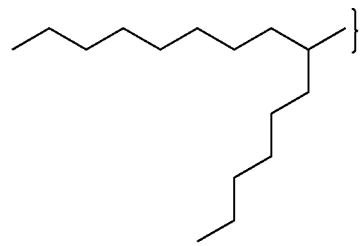

Representative examples of stabilizer compounds that have both the functional group that non-covalently associates with the pigment and the sterically bulky hydrocarbon moiety, include (but are not limited to) the following compounds:

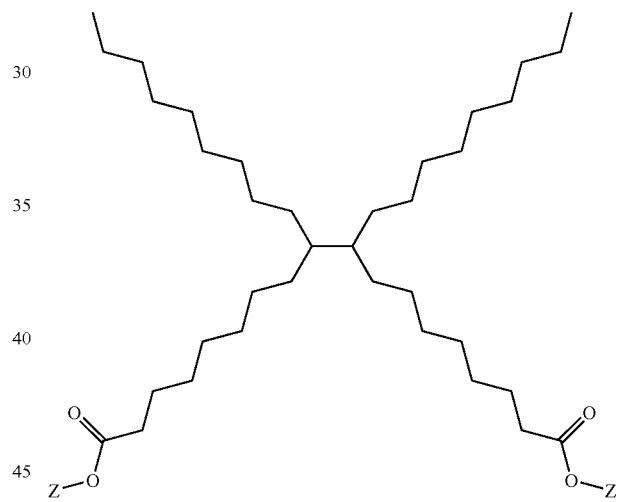

C36 Dimer Diacid

Z = H; Metal cations such as Na, K, Li, Ca, Ba, Sr, Mg, Mn, Al, Cu, B, and others;
Organic cations such as $NH_4^+$, $NR_4^+$, $PR_4^+$, and others

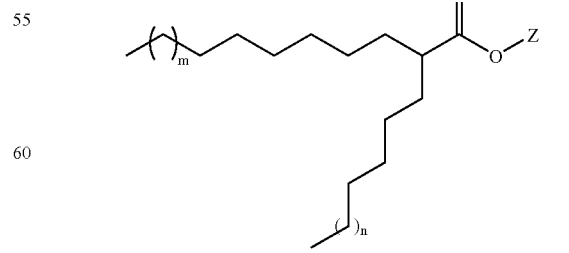

Z = H; Metal cations such as Na, K, Li, Ca, Ba, Sr, Mg, Mn, Al, Cu, B, and other;
Organic cations such as $NH_4^+$, $NR_4^+$, $PR_4^+$, and others
and methylene units (m + n) > 1

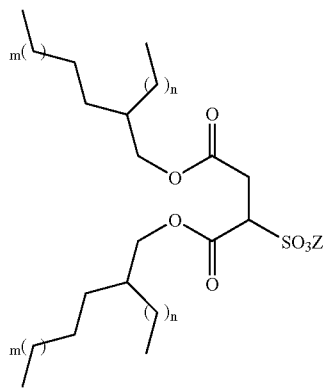

Z = H; Metal cations such as Na, K, Li, Ca, Ba, Sr, Mg, Mn, Al, Cu, B, and other;
Organic cations such as $NH_4^+$, $NR_4^+$, $PR_4^+$, and others
and methylene units (m + n) > 1  per branch

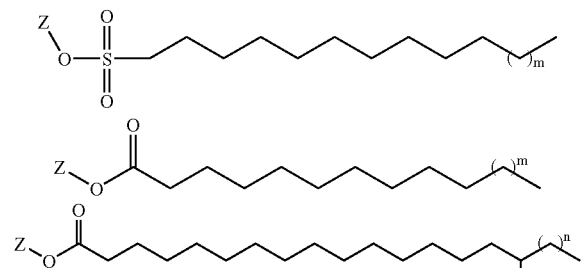

Z = H; Metal cations such as Na, K, Li, Ca, Ba, Sr, Mg, Mn, Al, Cu, B, and other;
Organic cations such as $NH_4^+$, $NR_4^+$, $PR_4^+$, and others
and methylene units m ≥ 1
and for iso-stearic acid, n ≤ 1 wherein m and n denotes the number of repeated methylene units, and where m can range between 1 and 50, and n can range between 1 and 5, however the values can also be outside these ranges.

In additional embodiments, other stabilizer compounds having different structures than those described previously may be used in addition to sterically bulky stabilizer compounds, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (salts of rosin acids), hydrogenated derivatives of rosins and their alkyl ester derivatives made from methanol, glycerol or pentaerythritol or other such hydrocarbon alcohols, acrylic-based polymers such as poly(acrylic acid), poly(m-ethyl methacrylate), styrene-based copolymers such as poly(styrene sodio-sulfonate) and poly(styrene)-co-poly(alkyl (meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate).

The types of non-covalent chemical bonding that can occur between the functional moiety of the precursor/pigment and the complementary functional group of the stabilizer are, for example, van der Waals' forces, ionic or coordination bonding, hydrogen bonding, and/or aromatic pi-stacking bonding. In embodiments, the non-covalent bonding is predominately ionic bonding, but can include hydrogen bonding and aromatic pi-stacking bonding as additional or alternative types of non-covalent bonding between the functional moieties of the stabilizer compounds and the precursor/pigment.

The "average" pigment particle size, which is typically represented as $d_{50}$, is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size can be measured by methods that use light scattering technology to infer particle size, such as Dynamic Light Scattering. The term "particle diameter" as used herein refers to the length of the pigment particle at the longest dimension (in the case of acicular shaped particles) as derived from images of the particles generated by Transmission Electron Microscopy (TEM). The term "nano-sized", "nanoscale", "nanoscopic", or "nano-sized pigment particles" refers to for instance, an average particle size, $d_{50}$, or an average particle diameter of less than about 150 nm, such as of about 1 nm to about 100 nm, or about 10 nm to about 80 nm. Geometric standard deviation is a dimensionless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n} (\ln A_i - \ln \mu_g)^2}{n}}$$

The method of making nano-sized particles of the monoazo laked pigments such as those listed in Table 7 is a process that involves at least one or more reaction steps. A diazotization reaction is a key reaction step for synthesis of the monoazo laked pigment, whereby a suitably substituted aniline precursor (denoted as diazo component DC) such as those listed in Table 1, and Formulas (2) and (3), is either directly or indirectly converted first to a diazonium salt using standard procedures, such as that which includes treatment with an effective diazotizing agent such as nitrous acid $HNO_2$ (which is generated in situ by mixing sodium nitrite with dilute protic acid solution such as hydrochloric acid), or nitrosyl sulfuric acid (NSA), which is commercially available or can be prepared by mixing sodium nitrite in concentrated sulfuric acid. Initially, it may be necessary to first dissolve the precursor substituted aniline in alkaline solution (such as aqueous potassium hydroxide solution, or ammonia water) followed by treatment with the diazotizing agent and acid solution, so as to generate the diazonium salt. The diazotization procedure is typically carried out at cold temperatures so as to keep the diazonium salt stable, and the resulting reaction mixture will comprise mainly the diazonium salt either dissolved or suspended as a precipitate in acidic medium. If desired and effective, an aqueous solution of the metal salt ($Mn^+$) can be optionally added that will define the specific composition of the desired monoazo laked pigment product, such as those listed in Table 7. A second solution or suspension is prepared by dissolving or suspending the nucleophilic coupling component (denoted as CC, such as those shown in Tables 2-6, and Formulas (4)-(8)) mainly into water, which may optionally contain another liquid such as an organic solvent (for example, iso-propanol, tetrahydrofuran, methanol, or other), and either acids or bases to render the coupling component into solution or a fine suspension and aid reaction with the diazonium salt solution, and additionally any buffers or surface active agents including the sterically bulky stabilizer compounds such as those described previously.

The reaction mixture containing the dissolved or suspended diazonium salt is then transferred into the solution or suspension of the desired nucleophilic coupling component, and the temperature of the mixture can range from about 10° C. to about 75° C., in order to produce a solid colorant material suspended as a precipitate in an aqueous slurry.

The solid colorant material may be the desired monoazo laked pigment product formed as nano-sized particles, or it may be an advanced synthetic intermediate for making the monoazo laked pigment product. In the case of the latter, a two-step process is required for preparing the nano-sized particles of monoazo laked pigment, whereby the second step involves rendering the advanced synthetic intermediate of the first step above (the pigment precursor) into homogeneous liquid solution by treatment with either strong acid or alkaline base, then treating this solution with one or more surface active agents in addition to the sterically bulky stabilizer compounds, as described previously, followed lastly by treatment with the required metal salt solution to provide the desired laked monoazopigment composition as a solid precipitate, said metal salt solution effectively functioning as a pigment precipitating agent. There are several chemical as well as physical processing factors can affect the final particle size and distribution of the monoazo laked pigment nanoparticles, including stoichiometries of the DC and CC starting reactants, metal salt, surface active agents, and stabilizer compounds, the concentrations of chemical species in the liquid medium, pH of liquid medium, temperature, addition rate, order of addition, agitation rate, post-reaction treatments such as heating, isolation and washing of particles, and drying conditions.

In embodiments is disclosed a two-step method of making nano-sized monoazo laked red pigments, for example Pigment Red 57:1, wherein the advanced pigment precursor Lithol Rubine is first synthesized as a potassium salt and is a water-soluble orange dye. The first step involves the diazotization of 2-amino-5-methyl-benzenesulfonic acid (DC1 in Table 1) by first dissolving the DC in dilute aqueous potassium hydroxide solution (0.5 mol/L) and cooling to a temperature anywhere in the range of about −5° C. to about 5° C., and then treating the solution with an aqueous solution of sodium nitrite (20 wt %), following with slow addition of concentrated hydrochloric acid at a rate that maintains the internal reaction temperature between −5° C. and +5° C. The resulting suspension that forms is stirred for additional time so as to ensure completeness of diazotization, and then the suspension is carefully transferred to a second solution containing 3-hydroxy-2-naphthoic acid dissolved in dilute alkaline solution (0.5 mol/L potassium hydroxide), using vigorous agitation as the colorant product is produced in the aqueous slurry. After stirring for additional time of at least 1 hour at room temperature, the colorant product (Lithol Rubine-potassium salt) is isolated by filtration as an orange dyestuff and washed with deionized water to remove excess salt by-products.

The second step of the process involves redispersing the orange Lithol Rubine-potassium salt dyestuff in deionized water to a concentration that can range from about 0.5 wt % to about 20 wt %, such as from about 1.5 wt % to about 10 wt % or from about 3.5 wt % to about 8 wt %, but the concentrations can also be outside of these ranges. The colorant solids in the slurry is then dissolved completely into liquid solution by treatment with aqueous alkaline base, such as sodium hydroxide or potassium hydroxide or ammonium hydroxide solution, until the pH level is high, such as above pH 8.0 or above pH 9.0 or above pH 10.0. To this alkaline solution of dissolved Lithol Rubine colorant can be optionally added a surface active agent as described previously, in particular embodiments surface active agent such as rosin soaps, delivered as an aqueous solution in the amount ranging from 0.1 wt % to 20 wt % based on colorant solids, such as in an amount ranging from 0.5 wt % to about 10 wt %, or in an amount ranging from 1.0 wt % to about 8.0 wt % based on colorant solids, but the amount used can also be outside of these ranges.

In embodiments, the preparation of ultrafine and nanosized particles of the monoazo laked Pigment Red 57:1 was only enabled by the additional use of a sterically bulky stabilizer compound having a functional group that could non-covalently bond to the complementary functional moiety of the pigment as well as branched aliphatic functional groups that could provide steric bulk to the pigment particle surface. In embodiments, particularly suitable sterically bulky stabilizer compounds are branched hydrocarbons with either carboxylate or sulfonate functional groups, compounds such as di[2-ethylhexyl]-3-sulfosuccinate sodium or sodium 2-hexyldecanoate, and the like. The stabilizer compound is introduced as a solution or suspension in a liquid that is predominantly aqueous but may optionally contain a water-miscible organic solvent such as THF, iso-propanol, NMP, Dowanol and the like, to aid dissolution of the stabilizer compound, in an amount relative to colorant moles ranging from about 5 mole-percent to about 100 mole-percent, such as from about 20 mole-percent to about 80 mole-percent, or from about 30 mole-percent to about 70 mole-percent, but the concentrations used can also be outside these ranges and in large excess relative to moles of colorant.

Lastly, the metal cation salt is added to transform the pigment precursor (Lithol Rubine-potassium salt in embodiments) into the desired monoazo laked pigment (Pigment Red 57:1 in embodiments), precipitated as nano-sized pigment particles. The aqueous solution of metal salt (calcium chloride in embodiments) with concentration ranging anywhere from 0.1 mol/L to about 2 mol/L, is slowly added dropwise in nearly stoichiometric quantities such as amounts ranging from 1.0 molar equivalents relative to about 2.0 molar equivalents, or from 1.1 to about 1.5 molar equivalents, or from 1.2 to about 1.4 molar equivalents relative to moles of colorant, however the amounts used can also be outside of these ranges and in large excess.

The type of metal salt can have an impact on the extent of forming nano-sized pigment particles of monoazo laked pigments, in particular the type of ligand that is coordinated to the metal cation and the relative ease with which it is displaced by a competing ligand from either the pigment functional moiety or the complementary functional moiety of the stabilizer compound, or both. In embodiments for monoazo laked Pigment Red 57:1, the nano-sized particles are formed using calcium (II) salts with ligands such as chloride, sulfate, acetate, and hydroxide; however a particularly desirable metal salt is calcium chloride for fastest reactivity.

The rates of addition of metal salt solution can also vary. For example, the slower the rate of addition, the more controlled is the rate of pigment crystal formation and particle aggregation, and therefore the smaller in size the pigment particles become.

Also important is the agitation rate and mixing pattern as the pigment formation/precipitation step is occurring. The higher the agitation rate and the more dynamic or complex is the mixing pattern (i.e. with baffles to prevent dead mixing zones), the smaller is the average particle diameter and the more narrow is the particle size distribution, as observable by Transmission Electron Microscopy (TEM) imaging. Agitation can be made more effective by using high-shear mixers such as homogenizers, attritors, our even the use of ultrasonic probes.

Temperature during the pigment precipitation step using the metal salt solution is also important. In embodiments, lower temperatures are desired, such as from about 10° C. to about 50° C., or from about 15° C. to about 30° C., but the temperature can also be outside of these ranges.

In embodiments, the slurry of pigment nanoparticles is not treated nor processed any further, such as additional heating, but instead is isolated by vacuum filtration through membrane filter cloth having average pore size of 0.45 micron or 0.8 micron diameter. The pigment solids can be washed copiously with deionized water to remove excess salts or additives that were not being non-covalently bound to the pigment particles, as intended by the stabilizer compounds. The pigment solids are subsequently dried by freeze-drying under high vacuum to afford high quality, non-agglomerated pigment particles that when imaged by TEM, exhibited primary pigment particles and small aggregates ranging in diameters from about 30 nm to about 150 nm, and predominantly from about 50 nm to about 125 nm. (Here, it is noted that average particle size $d_{50}$ and particle size distributions are measured by Dynamic Light Scattering, an optical measurement technique that estimates the hydrodynamic radius of non-spherical pigment particles gyrating and translating in a liquid dispersion via Brownian motion, by measuring the intensity of the incident light scattered from the moving particles. As such, the $d_{50}$ particle size metric obtained by DLS technique is always a larger number than the actual particle diameters observed by TEM imaging.)

Characterization of the chemical composition of washed and dried nanosized pigment particles are performed by NMR spectroscopy and elemental analysis. In embodiments, the composition of the monoazo laked pigment Red 57:1 indicated that the nanosized particles prepared by the method described above, using di[2-ethylhexyl]-3-sulfosuccinate sodium as the sterically bulky stabilizer, retained at least 80% of the sterically bulky stabilizer that was loaded into the process of making the nanoparticles, even after copious washing with deionized water to remove excess salts. Solid state $^1$H— and $^{13}$C-NMR spectroscopic analyses indicated that the steric stabilizer compound was associated non-covalently with the pigment as a metal salt, and the structure of the pigment was predominantly of the hydrazone tautomeric form, as shown in the equilibrium scheme below.

Pigment particles of monoazo laked pigments such as PR 57:1 that have smaller particle sizes could also be prepared by the above two-step method with the use of surface active agents alone depending on the concentrations and process conditions employed, but the pigment product did not predominantly exhibit nano-sized particles nor did the particles exhibit regular morphologies. By comparison, in the absence of using the sterically bulky stabilizer compound, the two-step method described above typically produced rod-like particle aggregates, ranging in average particle diameter from 200-700 nm and with wide particle distribution, and such particles were difficult to disperse into a polymer coating matrix and gave poor coloristic properties. In embodiments, the combined use of a suitable sterically bulky stabilizer compound, such as branched alkanesulfonates or alkylcarboxylates, with a minor amount of suitable surface active agent such as derivatives of rosin-type natural products, by the two-step process would afford the smallest fine pigment particles in the nanometer-scale diameters, more narrow particle size distribution, and low aspect ratio. Various combinations of these compounds, in addition to variations with process parameters such as stoichiometry of reactants, concentration, addition rate, temperature, agitation rate, reaction time, and post-reaction product recovery processes, enables the formation of pigment particles with tunable average particle size ($d_{50}$) from nanoscale sizes (about 1 to about 100 nm) to mesoscale sizes (about 100 to about 500 nm) or larger. The dispersion ability and coloristic properties (L*, a*, b*, chroma, hue angle, light scatter index) of the pigment particles in a thin polymer binder coating were directly correlated to the average pigment particle size, which in turn was impacted by the structural type and amount of sterically bulky stabilizer compound that was employed in the synthesis process.

The advantages of this process include the ability to tune particle size and composition for the intended end use application of the monoazo laked pigment, such as toners and inks and coatings, which include phase-change, gel-based and radiation-curable inks, solid and non-polar liquid inks, solvent-based inks and aqueous inks and ink dispersions. For the end-use application in piezoelectric inkjet printing, nano-sized particles are advantageous to ensure reliable inkjet printing and prevent blockage of jets due to pigment particle agglomeration. In addition, nanosized pigment particles are advantageous for offering enhanced color properties in

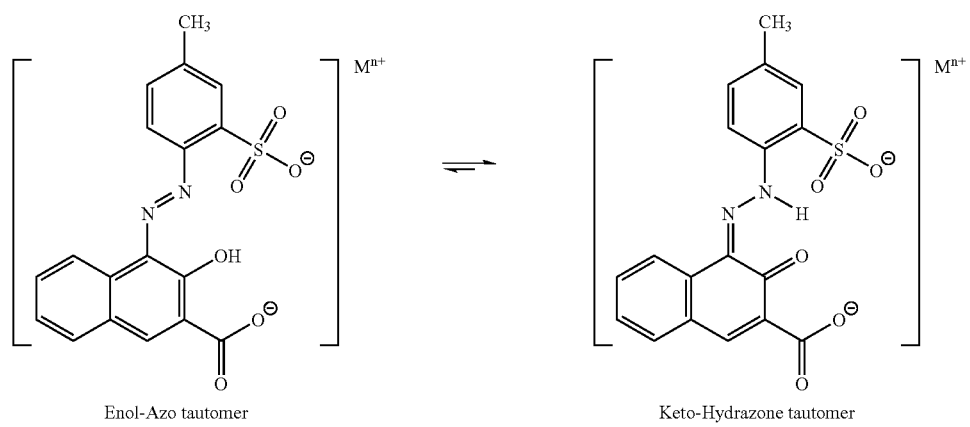

Enol-Azo tautomer        Keto-Hydrazone tautomer printed images, since in embodiments the color properties of nanosized particles of monoazo laked pigment Red 57:1 were tunable with particle size, whereby as average particle size was decreased to nanometer-scale, the hue angles were shifted from yellowish-red hues to bluish-red hues or violet-red hues by an amount ranging from about 5 to about 35° in the color gamut space.

The method of making nanosized particles of monoazo laked pigments can also be performed by a one-step method, wherein a suitable aniline precursor (or diazo component DC, such as those listed in Table 1), is either directly or indirectly converted first to a diazonium salt using standard procedures, such as that include treatment with a diazotizing agent such as nitrous acid $HNO_2$ (for example, generated in situ by mixing sodium nitrite with dilute hydrochloric acid solution) or nitrosyl sulfuric acid (NSA), which is commercially available or prepared by mixing sodium nitrite in concentrated sulfuric acid. The resulting acidic mixture of diazonium salt is either a solution or a suspension and is preferably kept cold, to which is added an aqueous solution of the metal salt ($M^{n+}$) that will define the specific composition of the desired monoazo laked pigment product, such as those listed in Table 7. The diazonium salt solution or suspension is then transferred into a solution or suspension of a suitable coupling component (CC, such as those listed in Tables 2-6) that can be either acidic or basic in pH and contain additional buffers and surface active agents, including the sterically bulky stabilizer compounds such as those described earlier, to produce a solid colorant material suspended as an aqueous slurry. The solid colorant material produced is the desired monoazo laked pigment product suspended in aqueous slurry, which is isolated by vacuum filtration, washed with copious amounts of deionized water to remove excess salt by-products, and preferably freeze-dried under vacuum, affording fine and nano-sized particles of the pigment.

In embodiments, the nanosized pigment particles that were obtained for monoazo laked pigments can range in average particle size, $d_{50}$, or average particle diameter, from about 10 nm to about 250 nm, such as from about 25 nm to about 175 nm, or from about 50 nm to about 150 nm, as measured by either dynamic light scattering method or from TEM images. In embodiments, the particle size distributions can range such that the geometric standard deviation can range from about 1.1 to about 1.9, or from about 1.2 to about 1.7, as measured by dynamic light scattering method. The shape of the nano-sized pigment particles can be one or more of several morphologies, including rods, platelets, needles, prisms or nearly spherical, and the aspect ratio of the nanosize pigment particles can range from 1:1 to about 10:1, such as having aspect ratio between 1:1 and 5:1; however the actual metric can lie outside of these ranges.

The color of the nanosized pigment particles have the same general hue as is found with larger pigment particles. However, in embodiments, is disclosed coloristic properties of thin coatings of the nanosized pigment particles of red monoazo laked pigments dispersed in a polymer binder (such as of poly(vinyl butyral-co-vinyl alcohol-co-vinyl acetate)), that exhibited a significant shift to lower hue angle and lower b* values that revealed more bluish magenta hues, and having either no change or a small enhancement of a* value. In embodiments, the hue angles of the coatings dispersed with the nanosized particles of monoazo laked pigment such as Pigment Red 57:1 measured in the range from about 3450 to about 5° on the 2-dimensional b* a* color gamut space, as compared with hue angles ranging from about 0° to about 200 for similarly prepared polymer coatings dispersed with larger sized particles of Pigment Red 57:1. In embodiments is disclosed the coloristic properties (hue angle, a*, b*, and NLSI as measure of specular reflectivity) of nanosized pigment particles, particularly of monoazo laked red pigment, that are directly correlated and tunable with the average pigment particle size, measured by either Dynamic Light Scattering or electron microscopy imaging techniques, as well as pigment composition with the non-covalently associated stabilizer, the latter which enables the control of particle size during pigment synthesis, and also enables enhanced dispersability within certain polymer binders for coating or other applications.

Additionally, the specular reflectivity of the coatings of the nanosize monoazo lakes red pigment was significantly enhanced from coatings produced with larger sized pigment particles, which is an indicator of having very small particles being well-dispersed within the coating. Specular reflectivity was quantified as the degree of light scattering for the pigmented coating, a property that is dependent on the size and shape distributions of the pigment particles and their relative dispersability within the coating binder. The Normalized Light Scatter Index (NLSI) was quantified by measuring the spectral absorbance of the coating in a region where there is no absorbance from the chromogen of the monoazo laked pigment, but only absorbance due to light scattered from large aggregates and/or agglomerated pigment particles dispersed in the coating binder. The light scattering absorbance data is then normalized to a lambda-max optical density of 1.5, resulting in the NLSI value, in order to directly compare the light scattering indices of several pigmented coatings. The lower is the NLSI value, the smaller is the pigment particle size within the dispersed coating matrix. In embodiments, the NLSI value of the nanosized monoazo laked red pigments can range from about 0.1 to about 3.0, such as from about 0.1 to about 1.0, as compared to the NLSI values observed with similarly prepared coatings containing larger sized monoazo laked red pigments that range anywhere from about 3.0 to about 75 (a very poorly dispersed coating).

The formed nanoscale pigment particle compositions can be used, for example, as coloring agents in a variety of compositions, such as in liquid non-aqueous ink vehicles, including inks used in conventional pens, markers, and the like, liquid ink jet ink compositions, solid or phase change ink compositions, and the like. For example, the colored nanoparticles can be formulated into a variety of ink vehicles, including "low energy" solid inks with melt temperatures of about 60 to about 130° C., and solvent-based liquid inks or radiation-curable such as TV-curable liquid inks comprised of alkyloxylated monomers, and also aqueous inks. Various types of such compositions will now be described in more detail.

In embodiments, these nanoscale-sized pigments can be dispersed in a variety of media where such high specular reflectance is afforded. Polymeric binders (polymeric dispersants) that aid in the dispersion and coating ability of nanoscale-sized pigments include, but are not limited to, derivatives of rosin natural products, acrylic-based polymers, styrene-based copolymers, copolymers of α-olefins such as 1-hexadecene, 1-octadecene, 1-eicosene, 1-triacontene and the like, copolymers of vinyl pyridine, vinyl imidazole, vinyl pyrrolidinone, polyester copolymers, polyamide copolymers, and copolymers of acetals. Other examples of polymeric dispersants include, but are not limited to, poly(vinyl butyral-co-vinyl alcohol-co-vinyl acetate), poly(vinyl acetate), poly(acrylic acid), poly(methacrylic acid), poly(vinyl alcohol), poly(N-vinylcarbazole), poly(methyl methacrylate), polyvinylidene difluoride, polyesters such as MOR-ESTER 49000®, polycarbonate polymers such as Lexan®, and Merlon® M-39, and poly(2-hydroxyethyl methacrylate), poly (styrene-b-4-vinylpyridine), polyurethane resins, polyetheretherketones, phenol-formaldehyde resins, polyols such as Pluronic® and Pluronic® R polymers, glycolic polymers such as polyethylene glycol polymers and their derivatives, polysulfones, polyarylethers, polyarylsulfones, and the like. Suitable mixtures of at least two polymers can also be used to disperse nanoscale-sized pigments in liquid media.

Many available commercial dispersants, such as those from BYK-Chemie, Efka Additives, and Lubrizol are well-suited to disperse pigments in a variety of liquid media. However, where it is applicable, for example, that a pigmented dispersion be used to make a coating, it is often generally beneficial to include a polymer resin in the pigmented dispersion to help reinforce the coated film, cohesively and adhesively, to the coating substrate. In the case where small registered drops on a substrate are obtained, such as, for example, from continuous ink jet printing or from drop on demand ink jet printing, a desired facet of an image can be improved upon, such as image gloss or rub, with the inclusion of a polymer resin in the pigmented dispersion or ink.

Suitable carrier liquids or solvents that can be used to disperse the nanoscale-sized pigments with various polymers where solubility of the polymers is ensured include, but are not limited to, acetone, acetonitrile, methyl acetate, ethyl acetate, n-butyl acetate, methoxypropylacetate, tetrahydrofuran, methanol, ethanol, n-propanol, iso-propanol, n-butanol, iso-butanol, sec-butanol, propylene glycol monomethyl ether, ethylene glycol monomethyl ether, diethylene glycol monomethyl ether, dipropylene glycol methyl ether, propylene glycol methyl ether acetate, methyl ethyl ketone, methyl isobutyl, ketone, toluene, o-xylene, m-xylene, p-xylene, monochlorobenzene, chloromethane, dichloromethane, and the like. Of course, mixture of two or more solvents and/or mixtures of two or more polymeric dispersants can be used, in embodiments, as desired. Thus, for example, it may be desirable in embodiments to use suitable mixtures of at least two solvents with one polymeric binder to effect dispersion and good coating ability of the nanoscale-sized pigments. It may also be desirable in embodiments to use suitable mixtures of at least two solvents with at least two polymeric binders to effect dispersion and good coating ability of the nanoscale-sized pigments.

Other carrier liquids or solvents that can be used to disperse the nanoscale-sized pigments with various polymers where solubility of the polymers or resins are ensured, include drying oils, mainly consisting of polyunsaturated fatty acids, such as tung oil, soy oil, linseed oil, safflower oil, sunflower oil, canola oil, poppy seed oil, perilla oil, oiticica oil, walnut oil, various fish oils, and suitable mixtures thereof. Still other carrier liquids or solvents that can be used to disperse the nanoscale-sized pigments with various polymers where solubility of the polymers or resins are ensured, include non-drying oils such as paraffinic oils, naphthenic oils, isoparaffinic oils, neat's foot oil, rapeseed oil, cotton seed oil, castor oil, olive oil, coconut oil, silicone oils such as cyclomethicone and dimethicone, diester-based oils such as diisobutyl phthalate and dioctyl adipate, essential oils such as rose oil, and suitable mixtures thereof.

Suitable mixtures of various non-drying and drying oils may be used to adjust various physical properties of the carrier solvent system including its viscosity, surface tension, evaporation rate, intrinsic color, oxidative stability at various temperatures, solvation power of the pigment dispersant and other binder additives that may be present, that include, but are not limited to, resins based on urethanes, phenolics such as phenol formaldehydes, phenolic esters, phenolic acid esters, maleics, acrylics, epoxides, tall oil fatty acids, natural rosins and their derivatives such as rosin maleic esters, and the like.

Where it is deemed beneficial, suitable driers or drying agents such as soaps of cobalt, manganese, iron and vanadium, for example, can be used to aid in the drying of oil-based compositions containing nanoscale-sized pigments as they are applied on a substrate, for example, by ink jet printing. Examples of driers that aid in surface drying of the applied composition include cobalt octoate and manganese naphthenate. Examples of driers that aid in depth drying, that is the drying below the surface of the applied composition, are cerium octoate, zinc octoate and zirconium naphthenate. Usually it is preferable to include both surface and depth driers in oil-based compositions containing nanoscale-sized pigments to effect an evenly dried final product and thus avoid wrinkling.

The nanoscale-sized pigments can be formulated into a number of different coating compositions having various adhesive and coloristic properties on different media, including paperstock, cardstock, and flexible substrates such as Melinex®, Mylar®, Cronar® and the like.

Ink jet ink compositions according to this disclosure generally include a carrier, a colorant, and one or more additional additives. Such additives can include, for example, solvents, waxes, antioxidants, tackifiers, slip aids, curable components such as curable monomers and/or polymers, gallants, initiators, sensitizers, humectants, biocides, preservatives, and the like. Specific types and amounts of components will depend, of course, on the specific type of ink composition, such as liquid, curable, solid, hot melt, phase change, gel, or the like. The formed nanoscale pigment particle compositions can be used, for example, in such inks as colorants.

Generally, the ink compositions contain one or more colorant. Any desired or effective colorant can be employed in the ink compositions, including pigment, dye, mixtures of pigment and dye, mixtures of pigments, mixtures of dyes, and the like. In embodiments, the colorant used in the ink composition consists entirely of the formed nanoscale-sized pigment compositions. However, in other embodiments, the nanoscale-sized pigment compositions can be used in combination with one or more conventional or other colorant material, where the nanoscale-sized pigment compositions can form substantially most of the colorant material (such as about 90% or about 95% by weight or more), they can form a majority of the colorant material (such as at least 50% by weight or more), or they can form a minority of the colorant material (such as less than about 50% by weight). For the end-use application in piezoelectric inkjet printing, nano-sized pigment particles are advantageous to ensure reliable inkjet printing and prevent blockage of jets due to pigment particle agglomeration. In addition, nanosized pigment particles are advantageous for offering enhanced color properties in printed images, since in embodiments the color properties of nanosized particles of monoazo laked pigment Red 57:1 were tunable with particle size, whereby as average particle size ($d_{50}$) was decreased to nanometer-scale, the hue angles were shifted from yellowish-red hues to bluish-red hues by an amount ranging from about 5 to 35° in the color gamut space. In still other embodiments, the nanoscale-sized pigment compositions can be included in the ink composition in any other varying amount, to provide either colorant and/or other properties to the ink composition.

The colorant, such as nanoscale-sized pigment compositions in embodiments, can be present in the ink composition in any desired or effective amount to obtain the desired color or hue. For example, the colorant can typically be present in an amount of at least about 0.1 percent by weight of the ink, such as at least about 0.2 percent by weight of the ink or at least about 0.5 percent by weight of the ink, and typically no more than about 50 percent by weight of the ink, such as no more than about 20 percent by weight of the ink or no more than about 10 percent by weight of the ink, although the amount can be outside of these ranges.

The ink compositions can also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

The ink compositions can also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Other optional additives to the inks include clarifiers, such as UNION CAMPS X37-523-235 (commercially available from Union Camp); tackifiers, such as FORAL® 85, a glycerol ester of hydrogenated abietic (rosin) acid (commercially available from Hercules), FORAL®& 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like; and the like. Such additives can be included in conventional amounts for their usual purposes.

The ink composition also includes a carrier material, or mixture of two or more carrier materials. The carrier material can vary, for example, depending upon the specific type of ink composition. For example, suitable solvents and carrier materials include those discussed above.

In embodiments of the non-aqueous inks, the nanoscale-sized pigment composition can be used as colorants for solvent-borne inks such as petroleum-based inks which can include aliphatic hydrocarbons, aromatic hydrocarbons, and mixtures thereof, environmentally friendly soy and vegetable oil-based inks, linseed oil-based inks and other ink-based vehicles derived from natural sources. Other examples of ink vehicles for nanopigment particles include isophthalic alkyds, higher order alcohols and the like. In still other embodiments, the present invention of nanopigment particles can be applied towards inks used in relief, gravure, stencil, and lithographic printing.

The ink compositions of the present disclosure can be prepared by any desired or suitable method. For example, the ink ingredients can simply be mixed together with stirring to provide a homogeneous composition, although heating can also be used if desired or necessary to help form the composition.

An example is set forth herein below and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Examples of Compositions and Method of Making Nanosized Particles of Monoazo Laked Red Pigment Comparative Example 1

Preparation of Monoazo Laked Red Pigments (Red 57:1) Using a Two-Step Method

Step 1: Diazotization and Coupling: Into a 500 mL round bottom flask equipped with a mechanical stirrer, thermometer, and addition funnel was dissolved 2-amino-5-methyl-benzenesulfonic acid (8.82 g) into 0.5M KOH aqueous solution (97.0 mL). The resulting brown solution was cooled to 0° C. A 20 wt % aqueous solution of sodium nitrite ($NaNO_2$; 3.28 g dissolved into 25 mL water) was added slowly to the first solution while maintaining the temperature below 3° C. To the red-brown homogeneous mixture was added dropwise concentrated HCl (10M, 14.15 mL) over 1 hour, maintaining the internal temperature below 2° C. The mixture formed a pale brown suspension, and following complete addition of conc. HCl, the suspension was stirred an additional 30 min.

In a separate 2-L resin kettle was dissolved 3-hydroxy-2-naphthoic acid (8.86 g) into an aqueous solution of KOH (8.72 g) in water (100 mL). An additional 250 mL of water was added, and the light-brown solution was then cooled to 15° C. while stirring vigorously. The cold suspension of the diazonium salt suspension was then added slowly to the coupling solution while mixing vigorously. The color changed initially to a dark red solution, and ultimately to a yellowish-red (orange) slurry of precipitated dyestuff. The mixture was stirred for 2 hours while warming up to room temp, then filtered and diluted with about 500 mL of deionized water to produce an orange aqueous slurry of Lithol Rubine-Potassium salt dye (a synthetic precursor of Pigment Red 57:1) having solids content of about 1.6 wt %.

Step 2: Laking step to produce Pigment Red 57:1 particles: Into a 500 mL round bottom flask equipped with mechanical stirrer and condenser was charged 126 g of aqueous slurry of Lithol Rubine-Potassium salt dye precursor from above having about 1.6% wt solids content. The pH of the slurry was adjusted to at least 9.0 or higher by addition of 0.5 M KOH solution, after which the dyestuff was fully dissolved. An aqueous solution of calcium chloride dihydrate (0.5 M solution, 13 mL) was added dropwise to the slurry while stirring vigorously. A red precipitate formed immediately, and after addition was completed, the slurry was stirred for an additional 1 hour. The red slurry was then heated to about 75° C. for 20 min, then cooled to room temp. The slurry was filtered under high vacuum through a 1.2 µm acrylic polymer membrane, then reslurried twice with 200 mL portions of deionized water. The pH and conductivity of the filtrates after each filtration were measured and recorded, with the final wash filtrate having nearly neutral pH of 6.2 and conductivity of about 13.5 µS/cm, indicating low residual salts. The red pigment filtercake was reslurried into about 200 mL of DIW and freeze-dried for 48 hours, to afford a red colored powder (1.95 grams). TEM microscopy revealed long rod-like particles and aggregates, with particle diameters ranging from about 200 nm to about 700 nm, and large aspect ratios ranging from about 4:1 to about 10:1.

Example 1

Synthesis of Lithol Rubine-Potassium Salt Dye, a Precursor to Making Pigment Red 57:1

Diazotization Step: Into a 500 mL round bottom flask equipped with a mechanical stirrer, thermometer, and addition funnel was dissolved 2-amino-5-methylbenzenesulfonic acid (8.82 g) into 0.5M KOH aqueous solution (97.0 mL). The resulting brown solution was cooled to 0° C. A 20 wt % aqueous solution of sodium nitrite ($NaNO_2$; 3.28 g dissolved into 25 mL water) was added slowly to the first solution while maintaining the temperature below 3° C. To the red-brown homogeneous mixture was added dropwise concentrated HCl (10M, 14.15 mL) over 1 hour, maintaining the internal temperature below 2° C. The mixture formed a pale brown suspension, and following complete addition of conc. HCl, the suspension was stirred an additional 30 min.

Coupling Step: In a separate 2-L resin kettle was dissolved 3-hydroxy-2-naphthoic acid (8.86 g) into an aqueous solution of KOH (8.72 g) in water (100 mL). An additional 250 mL of water was added, and the light-brown solution was then cooled to 15° C. while stirring vigorously. The cold suspension of the diazonium salt suspension was then added slowly to the coupling solution while mixing vigorously. The color changed immediately to a dark red solution, and ultimately to a yellowish-red (orange) slurry of precipitated dyestuff. The mixture was stirred for 2 hours while warming up to room temp, then filtered and reslurried with about 500 mL of deionized water to produce an orange aqueous slurry of Lithol Rubine-Potassium salt dye having solids content of about 1.6 wt %.

Example 2

Preparation of Nanosized Particles of Monoazo Laked Pigment (Red 57:1)

Into a 500 mL round bottom flask equipped with mechanical stirrer and condenser was charged 126 g of aqueous slurry of Lithol Rubine-Potassium salt dye precursor from Example 1, having about 1.6% wt solids content. The pH of the slurry was adjusted to at least 9.0 or higher by addition of 0.5 M KOH solution, after which the dyestuff was fully rendered into homogeneous solution that was dark black-red in color. An aqueous solution 5 wt % Dresinate X (4.0 mL, available from Hercules, Wilmington, Del.) was added, followed by a solution containing sodium dioctyl sulfosuccinate (0.96 g) dissolved in 100 mL of 90:10 deionized water/THF mixture. No visible change was observed. An aqueous solution of calcium chloride dihydrate (0.5 M solution, 13 mL) was added dropwise to the slurry while stirring vigorously. A red precipitate formed immediately, and after complete addition of the calcium chloride solution, the slurry was stirred for an additional 1 hour. The red slurry was then heated to about 75° C. for 20 min, then cooled to room temp. The slurry was filtered under high vacuum through a 0.45 µm Nylon membrane cloth (available from PALL Corp., New York, USA), then reslurried twice with 75 mL portions of DIW. The pH and conductivity of the final wash filtrate was 7.4 and about 110 µS/cm, respectively, indicating that residual acids and salt by-products were removed. The red pigment filtercake was reslurried in about 250 mL of DIW and freeze-dried for 48 hours to afford a dark red colored powder (2.65 grams). Transmission electron microscopy images of the powder revealed platelet-like particles with particle diameters ranging from 30-150 nm. $^1$H-NMR spectroscopy analysis (300 MHz, DMSO-$d_6$) of the pigment indicated that the pigment adopted the hydrazone tautomer form, and that the dioctyl sulfosuccinate stabilizer compound was present at approximately 40 mol % and associated with a calcium cation (determined by ICP spectroscopy).

Example 3

Preparation of Nanosized Particles of Monoazo Laked Pigment comprising Calcium and Magnesium Into a 250-mL round-bottom flask equipped with mechanical stirrer and condenser was charged 58 g of aqueous slurry of Lithol Rubine-Potassium salt dye precursor from Example 1, adjusted to have 3.5%-wt solids content (4.33 mmol). The pH of the slurry was increased to above 9 by the addition of 0.5 M KOH solution, after which the dye was fully solubilized. An aqueous solution of a rosin soap (5 wt % Dresinate X, 4 mL, available from Hercules, Wilmington, Del.) was added while stirring, followed by a solution of sodium dioctyl sulfosuccinate (0.96 g, 2.16 mmol, available from Sigma Aldrich, Milwaukee, Wis.) dissolved in 90:10 DIW/THF mixture (43 mL). An aqueous solution containing a mixture of 6.5 mL of 0.5M magnesium chloride (3.25 mmol) and 6.5 mL of 0.5 M calcium chloride dehydrate (3.25 mmol) was slowly added to the slurry under vigorous agitation. A dark red precipitate formed immediately, and after addition was completed, the slurry was stirred for an additional 1 hour. The slurry was subsequently heated to about 50° C. for 20 min, then cooled to room temp, and the pH was adjusted 7.0 with the addition of dilute HCl solution. The slurry was then filtered under high vacuum through a filter membrane (0.8 µm Versapor® membrane, available from PALL Corp., New York, USA), then reslurried twice with 100 mL portions of deionized water, and filtered. The pH and conductivity of the final wash filtrate was respectively, 7.0 and 83 µS/cm. The dark red pigment wetcake was reslurried into 50 mL of deionized water and then freeze-dried to afford 1.27 g of a dark-red colored powder.

Example 4

Preparation of Nanosized Particles of Monoazo Laked Pigment Comprising Barium Into a 250-mL round-bottom flask equipped with mechanical stirrer and condenser was charged 55 g of aqueous slurry of Lithol Rubine-Potassium salt dye precursor from Example 1, adjusted to have 3.6%-wt solids content (4.3 mmol). The pH of the slurry was adjusted to above 9 by the addition of 0.5 M KOH solution. An aqueous solution of a rosin soap (5 wt % Dresinate X, 4 mL, available from Hercules, Wilmington, Del.) was added while stirring, followed by a solution containing sodium dioctyl sulfosuccinate (0.96 g, 2.15 mmol, available from Sigma Aldrich, Milwaukee, Wis.) dissolved in 90:10 DIW/THF mixture (45 mL). An aqueous solution containing barium chloride tetrahydrate (1.27 g, 5.191 mmol) was slowly added to the mixture under vigorous agitation. A crimson red precipitate formed immediately, and after addition was completed, the slurry was stirred for an additional 1 hour. The slurry was then heated to about 50° C. for 20 min, then cooled to room temp. The slurry was then filtered under vacuum through a filter membrane (0.8 μm Versapor® membrane, available from PALL Corp., New York, USA), then reslurried twice with 100 mL portions of deionized water, and filtered. The pH and conductivity of the final wash filtrate was respectively, 6.8 and 48 μS/cm. The red pigment wetcake was reslurried into about 60 mL of deionized water and then freeze-dried, to afford 2.67 g of a dark red powder.

Example 5

Preparation of Nanosized Particles of Monoazo Laked Pigment Comprising Barium Step A: Into a 250 ml beaker was charged 11.2 g 2-amino-5-methylbenzenesulfonic acid, 120 g deionized water and 7.4 g conc. $NH_4OH$. The contents were stirred at room temperature for 15 minutes, then filtered and the filtrate subsequently cooled in an ice bath to less than 5° C. An aqueous solution of sodium nitrite (18 ml of 23% $NaNO_2$ solution) was added to the filtrate.

Step B: To another 500 ml 3-neck round bottom flask equipped with mechanical stirrer and thermometer was charged 16.5 g conc. HCl and 110 g of ice (from deionized water). The solution was cooled to below 5° C., after which the filtrate (from step A) was added dropwise to acid solution while maintaining the temperature below 5° C. After complete addition, the reaction mixture was stirred for an additional 2 hours to produce the diazonium salt intermediate.

Step C: Into a separate 1-L beaker equipped with magnetic stir bar was charged 12.3 g of 2-hydroxy-3-naphthoic acid, 440 g deionized water and 14 g $Na_2CO_3$, and the solution was then cooled in an ice bath. The diazonium solution from Step B was then poured into the beaker under vigorous stirring, producing an orange dyestuff precipitate.

Step D: Into a 100 mL beaker was charged 3.0 g of barium chloride dihydrate and 30 g deionized water and the contents were stirred to dissolve. Into a 1 L beaker was charged 1.96 g isohexadecenyl succinic anhydride, 500 g deionized water and 3 mL conc. $NH_4OH$ and the contents were then stirred to dissolve. Under agitation, the orange dyestuff (79 g) from above Step C was added into the beaker. The barium chloride solution was then added slowly over 10 minutes at room temperature, followed by heating to 100° C. for 30 minutes, then cooled to room temp. The red precipitate that resulted was then filtered and the solids collected.

Example 6

Transmission Electron Microscopy Imaging of Nanosized Monoazo Laked Red Pigments The Transmission Electron Microscopy (TEM) images were obtained using a FEI CM20 microscope operating at an accelerating voltage of 120 kV. For the Comparative Example, in which the Pigment Red 57:1 was prepared using the same two-step standard process for making monoazo laked red pigment except without the presence of additives or steric stabilizers, the TEM images show large size aggregates of rod-like pigment particles having particle diameters ranging in length from about 200-700 nm, which is typical for this pigment composition. By contrast, the TEM of pigment sample from Example 2—a pigment which was prepared in the presence of a prescribed amount of steric stabilizer and rosin additive—showed ultrafine and nanoscale particles wherein particle diameters ranged in length from about 30-150 nm and where most particles had diameters below 100 rim in length. For the nanosized pigment from Example 3, synthesized in the presence of a prescribed amount of steric stabilizer and rosin additive and using a 1:1 mixture of $Ca^{2+}$ and $Mg^{2+}$ salts for laking the pigment, the TEM images show that the majority of particles are platelet-like nanoparticles having diameters ranging in length from about 50-200 nm, along with a smaller population of large pigment aggregates ranging from 500-1000 mm in length. For the nanosized pigment samples in Examples 4 and 5 composed of barium lakes each pigment having been prepared using different steric stabilizers and synthesis conditions, the TEM image of each pigment show nanoparticles having different morphologies, suggesting that the composition and amount of steric stabilizer has an effect on primary pigment particle size. For barium-laked pigment of Example 4, the TEM image shows needle-like particle morphologies with particle diameters (length) ranging from 25-150 nm, and widths that range from about 10-30 nm. In contrast, the TEM images of the barium-laked pigment of Example 5 showed platelet-like particle morphologies with particle diameters (length) ranging from 50-175 nm, and widths that range from about 50-70 nm.

Examples of Liquid Dispersions containing Nano-sized Pigments and Color Properties

Example 7

Preparation of Liquid Dispersions and of Polymer Coatings

Dispersions of samples of nano-sized pigment from Examples 2 and 3, as well as two commercial sources of PR 57:1 obtained from Clariant (L7B01) and Aakash, were prepared and evaluated in the following manner. Into each 30 mL bottle were placed 0.22 g of pigment, 0.094 g polyvinylbutyral (B30HH, available from Hoescht), 7.13 g n-butyl acetate (glass-distilled grade from Calcdon Laboratories) and 70.0 g ⅛" stainless steel shot (Grade 25 440C available from Hoover Precision Products). The bottles were transferred to ajar mill and were allowed to gently mill for 4 days at 100 RPM. Two draw-down coatings were obtained for each dispersion using an 8-path gap on clear Mylar film such that the wet thicknesses for each PR 57:1 sample coated were 0.5 and 1 mil.

The air-dried coatings on clear Mylar film were then dried in a horizontal forced-air oven at 100° C. for 20 minutes.

Example 8

Evaluation of Coatings Prepared from Liquid Pigment Dispersions

The coatings on clear Mylar film prepared as described in Example 7 were assessed for coloristic and light scattering properties in the following manner: The UV/VIS/NIR transmittance spectra of each coating were obtained using a Shimadzu UV160 spectrophotometer, and the results showed dramatically reduced light scattering and remarkable specular reflectivity for the nano-sized PR 57:1 pigment samples described herein, compared with the spectra of coatings prepared with commercial PR 57:1 pigment samples obtained from Clariant and Aakash. An attempt was made to quantify the degree of light scattering for several coatings, a property which is dependent on the size and shape distributions of pigment particles and the relative dispersability of the matrix onto clear Mylar film. The degree of light scattering in a coating is dependent on both the size and shape distributions of the pigment particles and their relative dispersability within the coating matrix, and the Normalized Light Scatter Index (NLSI) method was developed to be a measure of this characteristic for the pigmented coatings. Light scattering is quantified by first measuring the spectral absorbance of the coating in a region where there is no absorbance from the chromogen of the monoazo laked pigment (for PR 57:1, a suitable region is 700-900 nm), but only absorbance due to light scattered from large aggregates and/or agglomerated pigment particles dispersed in the coating binder. The Normalized Light Scatter Index (NLSI) is then obtained by normalizing each of the samples' light scattering indices (from 700 to 900 nm) to a lambda-max optical density=1.5. In this way, the degree of light scattering for each pigmented coating could be compared directly against each other. The lower the NLSI value, the smaller the inferred particle size of the dispersed pigment in the coating. The NLSI values are listed in Table 8 and were determined from the coatings prepared with dispersions of the sample pigments from Examples 2 and 3. The low values confirm the fact that nanoscale and ultrafine particles were obtained with these pigments, as observed in the TEM images described in Example 6.

The coloristic properties of the pigmented coatings on clear Mylar substrate were determined using an X-RITE 938 spectrodensitometer. $L^*$ $a^*$ $b^*$ and optical density values were obtained for each of the samples where the $L^*$ $a^*$ $b^*$ were normalized to an optical density of 1.5. Three replicate dispersions of nanosized pigment from Example 2 dispersed in PVB/n-butyl acetate vehicle, and film coatings thereof, were prepared according to the methodology described in Example 7. Table 8 contains the coloristic properties of the coatings, which revealed very reproducible $L^*a^*b^*$ data. Furthermore, the NLSI values determined from the replicate coatings indicate that the particle size distribution of the nanosized pigment dispersions produced using Example 2 pigment are also very reproducible. The $L^*a^*b^*$ data for coatings prepared from dispersion made with Example 3 pigment indicate a red-shifting of hues compared with values measured from dispersions made with Example 2 pigment. The data indicates that nanoscale particles of monoazo laked pigment samples prepared with mixed metal salts in the presence of steric stabilizers could provide pigments having small and ultrafine particle size with tunable coloristic properties. The FIGURE illustrates the significant shift in $b^*a^*$ gamut for coatings made from liquid dispersions with nanosized pigments from Examples 2 and 3, compared to the larger-sized, Comparative Example pigment PR 57:1—L7B01 (obtained from Clariant) which is a calcium lake and used in wide variety of applications. There exists the ability to tune the coloristic properties from bluish-reds to neutral reds and even yellowish-reds by synthesizing nanosized pigments in the presence of the disclosed steric stabilizers using the process of embodiments and using various stoichiometries of calcium and magnesium salts to prepare the laked pigments, all while still maintaining the pigment's nanoparticle size distributions.

TABLE 8

Coloristic ($L^*a^*b^*$) and light scattering (NLSI) values of monoazo laked red pigments (normalized to optical density = 1.5)

| Sample # | (Commercial pigment) Clariant PR57:1 (L7B 01) | Example 2 nanosized pigment (replicate 1) | Example 2 nanosized pigment (replicate 2) | Example 2 nanosized pigment (replicate 3) | Example 3 nanosized pigment |
|---|---|---|---|---|---|
| metal | Ca | Ca | Ca | Ca | 1:1 Ca:Mg |
| $L^*$ | 47.86 | 50.83 | 52.17 | 50.70 | 51.09 |
| $a^*$ | 71.06 | 76.55 | 79.82 | 77.78 | 77.76 |
| $b^*$ | 8.73 | −16.36 | −19.04 | −17.82 | −10.86 |
| Hue Angle (deg) | 6.6 | 347.9 | 347.0 | 346.6 | 352.0 |
| Normalized Light Scatter Index | 5.5 | 0.3 | 0.5 | 0.3 | 2.2 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A nanoscale-sized pigment particle composition, comprising:
   an organic monoazo laked pigment having at least one functional moiety, and
   a sterically bulky stabilizer compound having at least one functional group,
   wherein the mono-azo laked pigment comprises a monoazo dye molecule laked with a divalent metal cation;
   the functional moiety of the pigment associates non-covalently with the functional group of the stabilizer; and
   presence of the associated stabilizer limits an extent of particle growth and aggregation, so as to afford nanoscale-sized pigment particles.

2. The composition of claim 1, wherein the nanoscale-sized pigment particles have an average particle size of from about 10 nm to about 500 nm and have coloristic properties that are changeable in accordance with both particle composition and average particle size.

3. The composition of claim 1, wherein the nanoscale-sized pigment particles have an average particle diameter as derived from transmission electron microscopy imaging, of less than about 150 nm.

4. The composition of claim 1, wherein the at least one functional moiety of the organic monoazo laked pigment is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio) carboxylate esters, thiol esters, primary and secondary amides, primary and secondary amines, hydroxyl, ketone, aldehyde, oxime, hydroxylamino, enamines, porphyrins, (phthalo)cyanines, urethane, carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and mixtures thereof.

5. The composition of claim 1, wherein the organic monoazo laked pigment comprises a diazonium component linked to a coupling component through an azo or hydrazone group, with the metal cation.

6. The composition of claim 5, wherein the diazonium component is a compound of Formula (2):

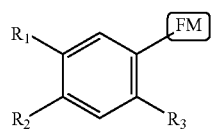

Formula (2)

where $R_1$, $R_2$, and $R_3$ independently represent H, a straight or branched alkyl group of from about 1 to about 10 carbon atoms, halogen, $NH_2$, $NO_2$, $CO_2H$, or $CH_2CH_3$; and FM represents $SO_2H$, —C(=O)—NH-Phenyl-$SO_3^-$, $CO_2H$, halogen, $NH_2$, or —C(=O)—$NH_2$,
or is a compound of Formula (3):

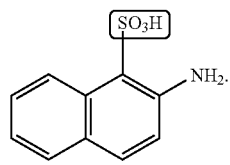

Formula (3)

7. The composition of claim 6, wherein the diazonium component is selected from the group consisting of the following compounds of Formula (2) wherein:
FM is $SO_3H$, $R_1$ is $CH_3$, $R_2$ is H, and $R_3$ is $NH_2$,
FM is $SO_3H$, $R_1$ is $CH_3$, $R_2$ is Cl, and $R_3$ is $NH_2$,
FM is $SO_3H$, $R_1$ is Cl, $R_2$ is $CH_3$, and $R_3$ is $NH_2$,
FM is $SO_3H$, $R_1$ is Cl, $R_2$ is $CO_2H$, and $R_3$ is $NH_2$,
FM is $SO_3H$, $R_1$ is Cl, $R_2$ is $CH_2CH_3$, and $R_3$ is $NH_2$,
FM is $SO_3H$, $R_1$ is Cl, $R_2$ is Cl, and $R_3$ is $NH_2$,
FM is $SO_3H$, $R_1$ is H, $R_2$ is $NH_2$, and $R_3$ is H,
FM is $SO_3H$, $R_1$ is H, $R_2$ is $NH_2$, and $R_3$ is $CH_3$,
FM is $SO_3H$, $R_1$ is $NH_2$, $R_2$ is H, and $R_3$ is Cl,
FM is $SO_3H$, $R_1$ is H, $R_2$ is H, and $R_3$ is $NH_2$,
FM is $SO_3H$, $R_1$ is H, $R_2$ is $NH_2$, and $R_3$ is H,
FM is $SO_3H$, $R_1$ is $NO_2$, $R_2$ is $NH_2$, and $R_3$ is H,
FM is —C(=O)—NH-Phenyl-$SO_3$—, $R_1$ is $NH_2$, $R_2$ is $CH_3$, and $R_3$ is H,
FM is $CO_2H$, $R_1$ is H, $R_2$ is H, and $R_3$ is $NH_2$,
FM is Cl, $R_1$ is H, $R_2$ is H, and $R_3$ is $NH_2$,
FM is $NH_2$, $R_1$ is $CH_3$, $R_2$ is H, and $R_3$ is H,
FM is $NH_2$, $R_1$ is H, $R_2$ is $CH_3$, and $R_3$ is H,
FM is —C(=O)$NH_2$, $R_1$ is $NH_2$, $R_2$ is $CH_3$, and $R_3$ is H,
FM is —C(=O)$NH_2$, $R_1$ is H, $R_2$ is $NH_2$, and $R_3$ is H, and
FM is $NH_2$, $R_1$ is H, $R_2$ is H, and $R_3$ is H.

8. The composition of claim 5, wherein the coupling component is selected from the group consisting of β-naphthol and derivatives thereof, naphthalene sulfonic acid derivatives, pyrazolone derivatives, and acetoacetic arylide derivatives.

9. The composition of claim 5, wherein the coupling component is selected from the group consisting of compounds of Formulas (4)-(8), wherein * denotes a point of coupling or attachment to the azo or hydrazone group:

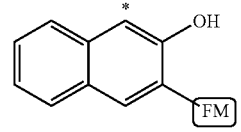

Formula (4)

where FM represents H, $CO_2H$, $SO_3H$, —C(=O)—NH-Aryl-$SO_3^-$ where the aryl group can be unsubstituted or substituted with either halogens or alkyl groups having from about 1 to about 10 carbons, halogen, $NH_2$, —C(=O)—$NH_2$, substituted benzamides of the formula

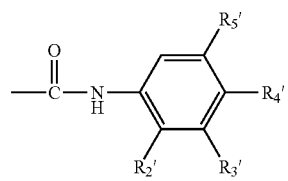

wherein $R_2'$ $R_3'$, $R_4'$ and $R_5'$ can independently be H, alkyl groups having from about 1 to 10 carbons, alkoxyl groups, hydroxyl, halogen, or $NO_2$, or benzimidazolone amides of the formula

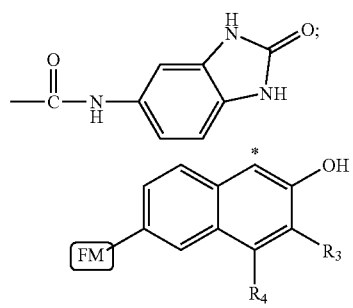

Formula (5)

where FM represents $SO_3H$, $CO_2H$, —C(=O)—NH-Aryl-$SO_3^-$ where the aryl group can be unsubstituted or substituted with either halogens or alkyl groups having from about 1 to about 10 carbons, halogen, $NH_2$, —C(=O)—$NH_2$, and $R_3$ and $R_4$ independently represent H or $SO_3H$;

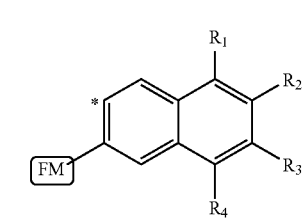

Formula (6)

where FM represents $SO_3H$, $CO_2H$, —C(=O)—NH-Aryl-$SO_3^-$ where the aryl group can be unsubstituted or substituted with either halogens or alkyl groups having from about 1 to about 10 carbons, halogen, $NH_2$, or —C(=O)—$NH_2$, and $R_1$, $R_2$, $R_3$ and $R_4$ independently represent H, $SO_3H$, or —C(=O)—NH-Phenyl;

Formula (7)

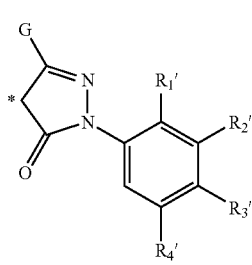

where G represents CO$_2$H or straight or branched alkyl having from 1 to about 10 carbons atoms, and R$_1$, R$_2$, R$_3$ and R$_4$ independently represent H, halogen, SO$_3$H, nitro (NO$_2$) or alkoxyl group.

Formula (8)

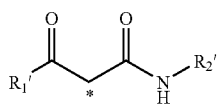

where R$_1$' represents a straight or branched alkyl group having from 1 to about 10 carbon atoms, R$_2$' represents

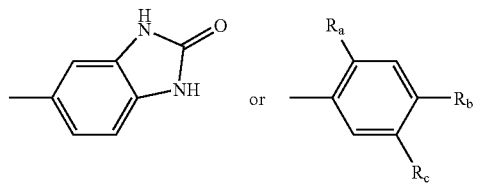

where each of R$_a$, R$_b$, and R$_c$ independently represents H, a straight or branched alkyl group having from 1 to about 10 carbon atoms, alkoxyl groups, halogen, or nitro.

10. The composition of claim 5, wherein the counterion is selected from the group consisting of divalent metals, nonmetals, and carbon-based cations or anions.

11. The composition of claim 1, wherein the at least one functional group of the sterically bulky stabilizer is selected from the group consisting of sulfonate/sulfonic acid, (thio) carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary and secondary amides, primary and secondary amines, hydroxyl, ketone, aldehyde, oxime, hydroxylamino, enamines, porphyrins, (phthalo)cyanines, urethane, carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and mixtures thereof.

12. The composition of claim 1, wherein the sterically bulky stabilizer comprises at least one aliphatic hydrocarbon moiety.

13. The composition of claim 1, wherein the sterically bulky stabilizer is selected from the group consisting of the following compounds:

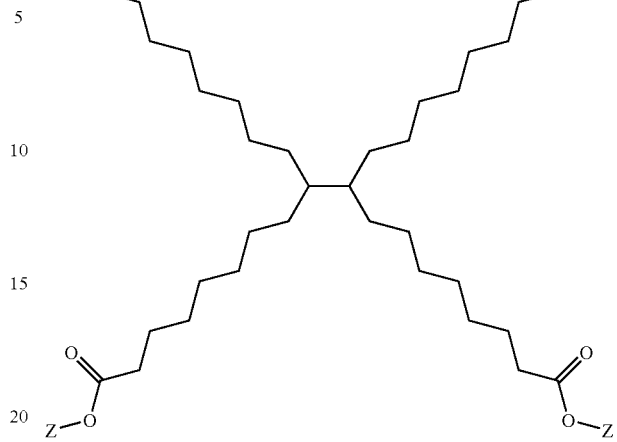

wherein Z is H, a metal cation, or an organic cation;

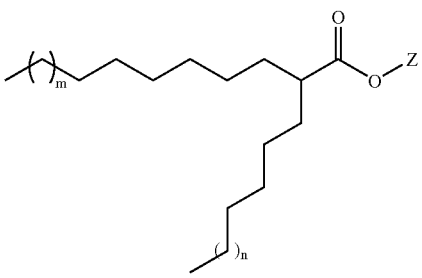

wherein Z is H, a metal cation, or an organic cation, and m+n>1;

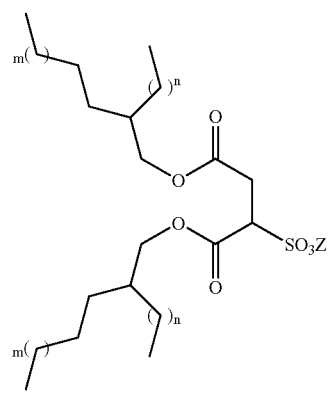

wherein Z is H, a metal cation, or an organic cation, and m+n>1 per branch;

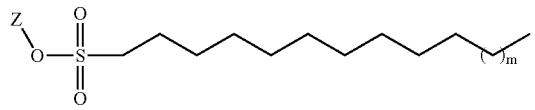

wherein Z is H, a metal cation, or an organic cation, and m≧1;

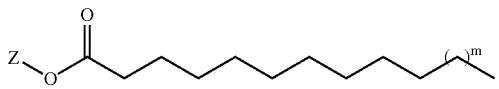

wherein Z is H, a metal cation, or an organic cation, and m>1; and

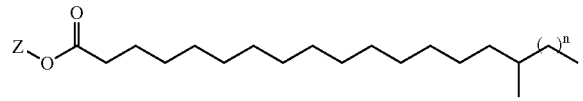

wherein Z is H, a metal cation, or an organic cation, and n≦1.

14. The composition of claim 1, further comprising a surfactant selected from the group consisting of derivatives of rosin natural products; acrylic-based polymers; styrene-based copolymers; copolymers of α-olefins; copolymers of vinyl pyridine, vinyl imidazole, and vinyl pyrrolidinone; polyester copolymers; polyamide copolymers; and copolymers of acetals and acetates.

15. The composition of claim 1, wherein the non-covalent association between the organic monoazo laked pigment and the sterically bulky stabilizer compound is at least one of van der Waals' forces, ionic bonding, coordination bonding, hydrogen bonding, and aromatic pi-stacking bonding.

16. A mixture of nanoscale-sized pigment particles, comprising:
the composition of claim 1,
wherein a first part of the mono-azo dye molecules are laked with a divalent metal cation other than $Ca^{2+}$, and a second part of the mono-azo dye molecules are laked with $Ca^{2+}$.

17. The composition of claim 2, wherein the coloristic properties are selected from the group consisting of L*, a*, b*, chroma C*, hue angle, normalized Light Scatter Index (NLSI), and combinations thereof.

18. The composition of claim 2, wherein the nanoscale pigment particles exhibit a hue angle, as derived from a 2-dimensional b* a* color gamut space, ranging from about 345° to about 0° and a NLSI value, calculated from spectral absorbance in the near-infrared spectral region between 700-900 nm, ranging of from about 0.1 to about 3.0.

19. A process for preparing nanoscale particles of monoazo laked pigments, comprising:
providing an organic pigment precursor to a monoazo laked pigment that contains at least one functional moiety,
providing a sterically bulky stabilizer compound that contains at least one functional group, and
carrying out a chemical reaction to form a monoazo laked pigment composition,
wherein the monoazo laked pigment comprises a monoazo dye molecule laked with a divalent metal cation,
whereby the functional moiety found on the pigment precursor is incorporated within the monoazo laked pigment and non-covalently associated with the functional group of the stabilizer, so as to allow the formation of nanoscale-sized pigment particles.

20. The process of claim 19, comprising:
preparing a first reaction mixture comprising: (a) a diazonium salt having at least one functional moiety as a first precursor to the laked pigment and (b) a liquid medium containing diazotizing agents; and
preparing a second reaction mixture comprising: (a) a coupling agent having at least one functional moiety as a second precursor to the laked pigment and (b) a sterically bulky stabilizer compound having one or more functional groups that associate non-covalently with the coupling agent; and (c) a liquid medium;
combining the first reaction mixture into the second reaction mixture to form a solution;
adding a solution of divalent metal cation to the third solution; and
effecting a direct coupling reaction which forms a monoazo laked pigment composition wherein the functional moiety associates non-covalently with the functional group and having nanoscale particle size.

21. A non-aqueous dispersion composition comprising:
a non-aqueous carrier,
a polymeric dispersant, and
a nanoscale pigment particle composition comprising:
an organic monoazo laked pigment having at least one functional moiety, and
a sterically bulky stabilizer compound having at least one functional group,
wherein the mono-azo laked pigment comprises a monoazo dye molecule laked with a divalent metal cation;
the functional moiety associates non-covalently with the functional group; and
presence of the sterically bulky stabilizer limits an extent of particle growth and aggregation, to afford nanoscale-sized pigment particles.

22. The composition of claim 21, wherein the nanoscale pigment particle composition imparts color to the non-aqueous dispersion composition.

23. The composition of claim 21, wherein the carrier is present in an amount of about 50 to about 99.9 weight %, and said nanoscale pigment particle composition is present in an amount of about 0.1 to about 50 weight % by weight of the non-aqueous dispersion composition.

24. The composition of claim 21, wherein the polymeric dispersant is selected from the group consisting of derivatives of rosin natural products, acrylic-based polymers, styrene-based copolymers, copolymers of α-olefins, copolymers of vinyl pyridine, vinyl imidazole, vinyl pyrrolidinone, polyester copolymers, polyamide copolymers, copolymers of acetals, poly(vinyl butyral-co-vinyl alcohol-co-vinyl acetate), poly(vinyl acetate), poly(acrylic acid), poly(methacrylic acid), poly(vinyl alcohol), poly(N-vinylcarbazole), poly(methyl methacrylate), polyvinylidene difluoride, polyesters, polycarbonate polymers, poly(2-hydroxyethyl methacrylate), poly(styrene-b-4-vinylpyridine), polyurethane resins, polyetheretherketones, phenol-formaldehyde resins, polyols, glycolic polymers, polysulfones, polyarylethers, and polyarylsulfones.

25. The composition of claim 21, wherein the polymeric dispersant is selected from the group consisting of copolymers of 1-hexadecene, copolymers of 1-octadecene, copolymers of 1-eicosene, copolymers of 1-triacontene, poly(vinyl butyral-co-vinyl alcohol-co-vinyl acetate), poly(vinyl acetate), poly(acrylic acid), poly(methacrylic acid), poly(vinyl alcohol), poly(methyl methacrylate), polyester, polycarbonate, poly(styrene-b-4-vinylpyridine), polyethylene glycol polymers and their derivatives, and mixtures thereof.

26. The composition of claim 21, wherein the carrier is selected from the group consisting of acetone, acetonitrile, methyl acetate, ethyl acetate, n-butyl acetate, methoxypropylacetate, tetrahydrofuran, methanol, ethanol, n-propanol, iso-propanol, n-butanol, iso-butanol, sec-butanol, propylene glycol monomethyl ether, ethylene glycol monomethyl ether, diethylene glycol monomethyl ether, dipropylene glycol methyl ether, propylene glycol methyl ether acetate, methyl ethyl ketone, methyl isobutyl, ketone, toluene, o-xylene, m-xylene, p-xylene, monochlorobenzene, chloromethane, dichloromethane, drying oils, non-drying oils, and mixtures thereof.

27. The composition of claim 21, wherein the composition is an ink composition.

28. The composition of claim 21, further comprising at least one additive selected from the group consisting of surfactants, light stabilizers, UV absorbers, optical brighteners, thixotropic agents, dewetting agents, slip agents, foaming agents, antifoaming agents, flow agents, oils, plasticizers, binders, electrically conductive agents, fungicides, bactericides, organic and inorganic filler particles, leveling agents, opacifiers, antistatic agents, dispersants, and mixtures thereof.

* * * * *